US011922797B2

(12) United States Patent
Takeda et al.

(10) Patent No.: US 11,922,797 B2
(45) Date of Patent: Mar. 5, 2024

(54) ENCODING DEVICE, ENCODING METHOD, DECODING DEVICE, DECODING METHOD, AND PROGRAM

(71) Applicant: Sony Corporation, Tokyo (JP)

(72) Inventors: Hirofumi Takeda, Kanagawa (JP); Shiro Suzuki, Kanagawa (JP); Shuichiro Nishigori, Tokyo (JP); Jun Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 26 days.

(21) Appl. No.: 17/254,566

(22) PCT Filed: Apr. 25, 2019

(86) PCT No.: PCT/JP2019/017710
§ 371 (c)(1),
(2) Date: Dec. 21, 2020

(87) PCT Pub. No.: WO2020/003728
PCT Pub. Date: Jan. 2, 2020

(65) Prior Publication Data
US 2021/0272426 A1    Sep. 2, 2021

(30) Foreign Application Priority Data
Jun. 28, 2018 (JP) .................. 2018-122963

(51) Int. Cl.
*G08B 6/00* (2006.01)
*A63F 13/285* (2014.01)

(52) U.S. Cl.
CPC ..................... *G08B 6/00* (2013.01)

(58) Field of Classification Search
CPC .......... G08B 6/00; G06F 3/016; A63F 13/285
(Continued)

(56) References Cited

U.S. PATENT DOCUMENTS

| 5,855,553 A | 1/1999 | Tajima et al. |
| 5,859,826 A | 1/1999 | Ueno et al. |

(Continued)

FOREIGN PATENT DOCUMENTS

| CN | 1639984 A | 7/2005 |
| CN | 101996413 A | 3/2011 |

(Continued)

OTHER PUBLICATIONS

International Search Report and English translation thereof dated Jun. 4, 2019 in connection with International Application No. PCT/JP2019/017710.

(Continued)

*Primary Examiner* — Quan Zhen Wang
*Assistant Examiner* — Mancil Littlejohn, Jr.
(74) *Attorney, Agent, or Firm* — Wolf, Greenfield & Sacks, P.C.

(57) ABSTRACT

To reduce a data amount required for tactile presentation while enabling driving of different types of tactile presentation devices corresponding to different physical amounts. An encoding device according to the present technology is provided with an encoding unit that generates coded data by performing encoding to compress an information amount by utilizing an interconversion property between physical amounts on a plurality of tactile signals representing different physical amounts. This makes it possible to obtain the tactile signals representing desired physical amounts within a range in which interconversion may be performed while compressing the information amount by utilizing the interconversion property between the physical amounts.

11 Claims, 11 Drawing Sheets

(58) Field of Classification Search
USPC .......................................... 340/407.1, 407.2
See application file for complete search history.

(56) References Cited

U.S. PATENT DOCUMENTS

| | | |
|---|---|---|
| 8,107,527 B1 | 1/2012 | Hobbs et al. |
| 9,264,094 B2 | 2/2016 | Daimou et al. |
| 9,626,845 B2 | 4/2017 | Eagleman et al. |
| 10,857,358 B2 | 12/2020 | Bouton et al. |
| 11,095,894 B2 | 8/2021 | Jeon et al. |
| 2003/0227374 A1 | 12/2003 | Ling et al. |
| 2008/0082321 A1 | 4/2008 | Ide |
| 2009/0066725 A1 | 3/2009 | Nogami et al. |
| 2013/0039412 A1 | 2/2013 | Narroschke et al. |
| 2014/0074696 A1* | 3/2014 | Glaser ................... G06F 21/32 726/19 |
| 2014/0122065 A1 | 5/2014 | Daimou et al. |
| 2015/0070261 A1 | 3/2015 | Saboune et al. |
| 2015/0241973 A1 | 8/2015 | Luden |
| 2016/0012688 A1 | 1/2016 | Eagleman et al. |
| 2016/0055726 A1 | 2/2016 | Aldossary et al. |
| 2016/0310844 A1 | 10/2016 | Yamashita et al. |
| 2016/0337734 A1 | 11/2016 | Efrati |
| 2018/0091575 A1 | 3/2018 | Toba et al. |
| 2018/0300651 A1 | 10/2018 | Knott et al. |
| 2020/0145661 A1 | 5/2020 | Jeon et al. |
| 2021/0266010 A1 | 8/2021 | Nishigori et al. |
| 2021/0366248 A1 | 11/2021 | Suzuki et al. |

FOREIGN PATENT DOCUMENTS

| | | | |
|---|---|---|---|
| CN | 104184721 A | 12/2014 | |
| CN | 104423590 A | 3/2015 | |
| EP | 0 732 082 A2 | 9/1996 | |
| EP | 1 125 557 A2 | 8/2001 | |
| EP | 2 034 390 A2 | 3/2009 | |
| EP | 2 846 219 A1 | 3/2015 | |
| JP | H8-215211 A | 8/1996 | |
| JP | 2003-169832 A | 6/2003 | |
| JP | 2009-069918 A | 4/2009 | |
| JP | 2010-029309 A | 2/2010 | |
| JP | 2011-523364 A | 8/2011 | |
| JP | 2013-091114 A | 5/2013 | |
| JP | 2013091114 A * | 5/2013 | |
| JP | 2014-239430 A | 12/2014 | |
| JP | 2015-053038 A | 3/2015 | |
| JP | 2015-053044 A | 3/2015 | |
| JP | 2015053038 A * | 3/2015 | ........... G06F 17/142 |
| JP | 2015-121918 A | 7/2015 | |
| JP | 2016-202486 A | 12/2016 | |
| JP | 2017-221631 A | 12/2017 | |
| JP | 2018-010582 A | 1/2018 | |
| JP | 2018-060313 A | 4/2018 | |
| JP | 2018060313 A * | 4/2018 | ............... A41D 1/00 |
| JP | 2018-097850 A | 6/2018 | |
| JP | 2018-526722 A | 9/2018 | |
| JP | 2019-185678 A | 10/2019 | |
| WO | WO 2017/001293 A1 | 1/2017 | |
| WO | WO 2017/175868 A1 | 10/2017 | |
| WO | WO 2018/008217 A1 | 1/2018 | |
| WO | WO 2018/092595 A1 | 5/2018 | |

OTHER PUBLICATIONS

International Written Opinion and English translation thereof dated Jun. 4, 2019 in connection with International Application No. PCT/JP2019/017710.

International Preliminary Report on Patentability and English translation thereof dated Jan. 7, 2021 in connection with International Application No. PCT/JP2019/017710.

International Search Report and English translation thereof dated Jul. 16, 2019 in connection with International Application No. PCT/JP2019/017709.

International Written Opinion and English translation thereof dated Jul. 16, 2019 in connection with International Application No. PCT/JP2019/017709.

International Preliminary Report on Patentability and English translation thereof dated Jan. 7, 2021 in connection with International Application No. PCT/JP2019/017709.

International Search Report and English translation thereof dated Jul. 23, 2019 in connection with International Application No. PCT/JP2019/017711.

International Written Opinion and English translation thereof dated Jul. 23, 2019 in connection with International Application No. PCT/JP2019/017711.

International Preliminary Report on Patentability and English translation thereof dated Jan. 14, 2021 in connection with International Application No. PCT/JP2019/017711.

Hoshino et al., Jorro Beat: Improvment of Music Experience in the Bathroom by Shower Tactile Stimulation. The Transactions of Human Interface Society. Dec. 31, 2016;18(2):77-86.

Mizukami et al., Tactile Transmission by Higher-Level Perception Using Vibration of Shape Memory Alloy Thread. IPSJ Journal. Dec. 2007;48(12):3739-49.

Sakaguchi, Haptic Recognition System Based on Sensory Integration and Active Perception. Transactions of the Society of Instrument and Control Engineers. Aug. 31, 1995;31(8):1217-1226.

U.S. Appl. No. 17/255,537, filed Dec. 23, 2020, Suzuki et al.

U.S. Appl. No. 17/254,792, filed Dec. 21, 2020, Nishigori et al.

* cited by examiner

# ENCODING DEVICE, ENCODING METHOD, DECODING DEVICE, DECODING METHOD, AND PROGRAM

CROSS-REFERENCE TO RELATED APPLICATIONS

This application claims the benefit under 35 U.S.C. § 371 as a U.S. National Stage Entry of International Application No. PCT/JP2019/017710, filed in the Japanese Patent Office as a Receiving Office on Apr. 25, 2019, which claims priority to Japanese Patent Application Number JP2018-122963, filed in the Japanese Patent Office on Jun. 28, 2018, each of which is hereby incorporated by reference in its entirety.

TECHNICAL FIELD

The present technology relates to an encoding device that encodes a tactile signal such as a vibration signal and a method thereof, a decoding device that decodes coded data obtained by encoding the tactile signal and a method thereof, and a program.

BACKGROUND ART

In recent years, applications that give tactile stimuli by a tactile presentation device in contact with human skin are used in various situations. Here, "tactile presentation" means generation of a tactile stimulus.

For example, in a mobile terminal equipped with a touch panel such as a smartphone, a touch feeling of a button is simulated by vibrating the panel (or housing) to give a tactile stimulus to a finger when the panel is touched.

In music listening, a tactile presentation device is built in a headphone housing, and a tactile stimulus is given in parallel with music playback to emphasize deep bass.

In fields of computer games and virtual reality (VR), a tactile presentation device is installed in a controller to interactively give tactile stimuli according to a scene in response to user's operation to increase user's immersive feeling.

In amusement facilities, a tactile presentation device installed in a seat gives a visitor a tactile stimulation according to a scene in a movie theater, a theme park and the like to improve a realistic feeling of the visitor.

Furthermore, in research and development stages, when a robot and the like is remotely controlled, a vibration received by the robot or a target to be operated is fed back to a controller at operator's hand, so that a situation around the robot or the target is intuitively obtained to be used for predicting danger (example: disaster response robot <http://www.rm.is.tohoku.ac.jp/quince_mech/#_8>).

Moreover, in a medical field, research is being conducted to improve surgical accuracy by feeding back to an operator a feeling (hardness) of forceps of an endoscope touching an organ when operating a surgical robot (example: surgical support robot Da Vinci <http://techon.nikkeibp.co.jp/article/FEATURE/20150217/4044 60/?P=2>).

Note that following Patent Documents 1 and 2 disclose related conventional technologies.

CITATION LIST

Patent Document

Patent Document 1: Japanese Patent Application Laid-Open No. 2016-202486

Patent Document 2: Japanese Patent Application Laid-Open No. 2015-53038

SUMMARY OF THE INVENTION

Problems to be Solved by the Invention

Here, there are a wide variety of tactile presentation devices (tactile presentation devices) for giving tactile stimuli to humans, and there also are a wide variety of physical amounts that should be represented by electrical signals for driving them such as acceleration, displacement, and angular speed. As a system that reproduces tactile information, a system in which different types of tactile presentation devices corresponding to different physical amounts are used in a mixed manner is also assumed, and in such a case, it is required to prepare signals representing a variety of physical amounts as a tactile signal so that any tactile presentation device may use the same.

However, if all physical amounts are recorded and transmitted, an information amount becomes enormous, which leads to an increase in system load.

The present technology is achieved in view of the above-described circumstances, and an object thereof is to reduce a data amount required for tactile presentation while enabling driving of different types of tactile presentation devices corresponding to different physical amounts.

Solutions to Problems

An encoding device according to the present technology is provided with an encoding unit that generates coded data by performing encoding to compress an information amount by utilizing an interconversion property between physical amounts on a plurality of tactile signals representing different physical amounts.

This makes it possible to obtain the tactile signals representing desired physical amounts within a range in which interconversion may be performed while compressing the information amount by utilizing the interconversion property between the physical amounts.

In the encoding device according to the present technology described above, the encoding unit desirably allows the coded data to include a specific signal that is a tactile signal representing a specific physical amount, and error information indicating a conversion error when the specific signal is converted into a tactile signal representing another physical amount.

Therefore, the decoding side may correctly obtain the tactile signal representing the physical amount other than the physical amount of the specific signal (specific physical amount) by correcting the signal obtained by physical amount conversion of the specific signal on the basis of the error information. Therefore, it becomes not necessary that the coded data includes the tactile signal itself representing the physical amount other than the specific physical amount.

In the encoding device according to the present technology described above, the encoding unit desirably allows the coded data to include difference information indicating a difference value between the specific signal and the tactile signal representing another physical amount as the error information.

Therefore, the error correction for the converted signal of the specific signal may be realized by a simple process of adding the difference value indicated by the difference information to the converted signal of the specific signal.

In the encoding device according to the present technology described above, the encoding unit desirably allows the coded data to include identification information for identifying the physical amount represented by the specific signal as the error information.

Therefore, it becomes not necessary to perform signal analysis on the specific signal when specifying the physical amount of the specific signal on the decoding side.

In the encoding device according to the present technology described above, the encoding unit desirably performs encoding to compress an information amount by utilizing an interconversion property by calculus as the encoding.

Therefore, on the decoding side, the tactile signal representing a desired physical amount out of displacement, speed, and acceleration may be obtained on the basis of the coded data.

Furthermore, an encoding method according to the present technology is an encoding method provided with generating coded data by performing encoding to compress an information amount by utilizing an interconversion property between physical amounts on a plurality of tactile signals representing different physical amounts.

By such encoding method also, an effect similar to that of the encoding device according to the above-described present technology may be obtained.

Moreover, a first program according to the present technology is a program that allows an information processing device to realize a function of generating coded data by performing encoding to compress an information amount by utilizing an interconversion property between physical amounts on a plurality of tactile signals representing different physical amounts.

By such first program according to the present technology, the encoding device according to the present technology described above is realized.

A decoding device according to the present technology is provided with a decoding unit that decodes coded data generated by performing encoding to compress an information amount by utilizing an interconversion property between physical amounts on a plurality of tactile signals representing different physical amounts to obtain a tactile signal.

This makes it possible to obtain the tactile signals representing desired physical amounts within a range in which interconversion may be performed while compressing the information amount by utilizing the interconversion property between the physical amounts.

In the decoding device according to the present technology described above, the coded data desirably includes a specific signal that is a tactile signal representing a specific physical amount and error information indicating a conversion error when the specific signal is converted into a tactile signal representing another physical amount, and the decoding unit desirably converts the specific signal into the tactile signal representing another physical amount and corrects the converted tactile signal on the basis of the error information.

Therefore, it becomes not necessary that the coded data includes the signal itself as for the tactile signal representing the physical amount other than the physical amount of the specific signal (represented as "specific physical amount"). At that time, since the signal obtained by the physical amount conversion of the specific signal is corrected on the basis of the error information, it becomes possible to correctly obtain the tactile signal representing the physical amount other than the specific physical amount.

In the decoding device according to the present technology described above, the error information is desirably made difference information indicating a difference value between the specific signal and the tactile signal representing another physical amount.

Therefore, the error correction for the converted signal of the specific signal may be realized by a simple process of adding the difference value indicated by the difference information to the converted signal of the specific signal.

In the decoding device according to the present technology described above, the coded data desirably includes identification information for identifying the physical amount represented by the specific signal, and the decoding unit desirably performs the decoding on the basis of the identification information.

Therefore, it becomes not necessary to perform signal analysis on the specific signal when specifying the physical amount of the specific signal.

In the decoding device according to the present technology described above, in a case where the physical amount of the specific signal specified on the basis of the identification information coincides with a predetermined physical amount, the decoding unit desirably outputs the specific signal.

Therefore, it is possible to appropriately drive the tactile presentation device on the basis of the specific signal corresponding to a case where the physical amount of the specific signal coincides with the physical amount to which the tactile presentation device corresponds.

In the decoding device according to the present technology described above, in a case where the physical amount of the specific signal specified on the basis of the identification information does not coincide with a predetermined physical amount, the decoding unit desirably converts the specific signal into a signal representing the predetermined physical amount and corrects the converted signal on the basis of the error information to output.

Therefore, it is possible to appropriately drive the tactile presentation device by the signal obtained by correcting the converted signal of the specific signal on the basis of the error information corresponding to a case where the physical amount of the specific signal does not coincide with the physical amount to which the tactile presentation device corresponds.

In the decoding device according to the present technology described above, the decoding unit desirably decodes the coded data generated by encoding to compress an information amount by utilizing an interconversion property by calculus.

Therefore, the tactile signal representing a desired physical amount out of displacement, speed, and acceleration may be obtained on the basis of the coded data.

In the decoding device according to the present technology described above, it is desirable that the decoding unit adjusts the amplitude of the tactile signal obtained by the decoding.

This makes it possible to appropriately adjust magnitude of the amplitude of the tactile signal according to the type of the tactile presentation device driven on the basis of the tactile signal.

Furthermore, a decoding method according to the present technology is a decoding method of decoding coded data generated by performing encoding to compress an information amount by utilizing an interconversion property between physical amounts on a plurality of tactile signals representing different physical amounts to obtain a tactile signal.

By such decoding method also, an effect similar to that of the decoding device according to the above-described present technology may be obtained.

Moreover, a second program according to the present technology is a program that allows an information processing device to realize a function of obtaining a tactile signal by decoding coded data generated by performing encoding to compress an information amount by utilizing an inter-conversion property between physical amounts on a plurality of tactile signals representing different physical amounts.

By such second program according to the present technology, the decoding device according to the present technology described above is realized.

Effects of the Invention

According to the present technology, it becomes possible to reduce the data amount required for tactile presentation while enabling driving of the different types of tactile presentation devices corresponding to different physical amounts.

Note that, the effects are not necessarily limited to the effects herein described and may be the effects described in the present disclosure.

MODE FOR CARRYING OUT THE INVENTION

Hereinafter, embodiments according to the present technology are described in the following order with reference to the accompanying drawings.

<1. Overview of tactile reproduction system>
<2. Configuration of encoding device>
<3. Configuration of decoding device>
<4. Tactile reproduction method as embodiment>
[4-1. First example]
[4-2. Second example]
[4-3. Example of encoding format]
[4-4. Functional configuration on decoding side]
[4-5. Decoding side procedure]
<5. Variation>
<6. Summary of Embodiment>
<7. Present technology>

Here, in this specification, each term is defined as follows.

Tactile stimulus: a physical phenomenon that causes a person to perceive a tactile sense, for example, a vibration phenomenon and the like.

Tactile presentation: generation of a tactile stimulus.

Tactile information: information perceived by a tactile sense, for example, vibration information and the like.

Tactile signal: a signal that represents a tactile stimulus pattern, for example, a signal that represents a vibration waveform and the like.

Receiving person: a person who receives tactile presentation.

Coded data: data obtained by encoding a signal.

There are streams and frames as more specific concepts.

1. OVERVIEW OF TACTILE REPRODUCTION SYSTEM

Figure 1:
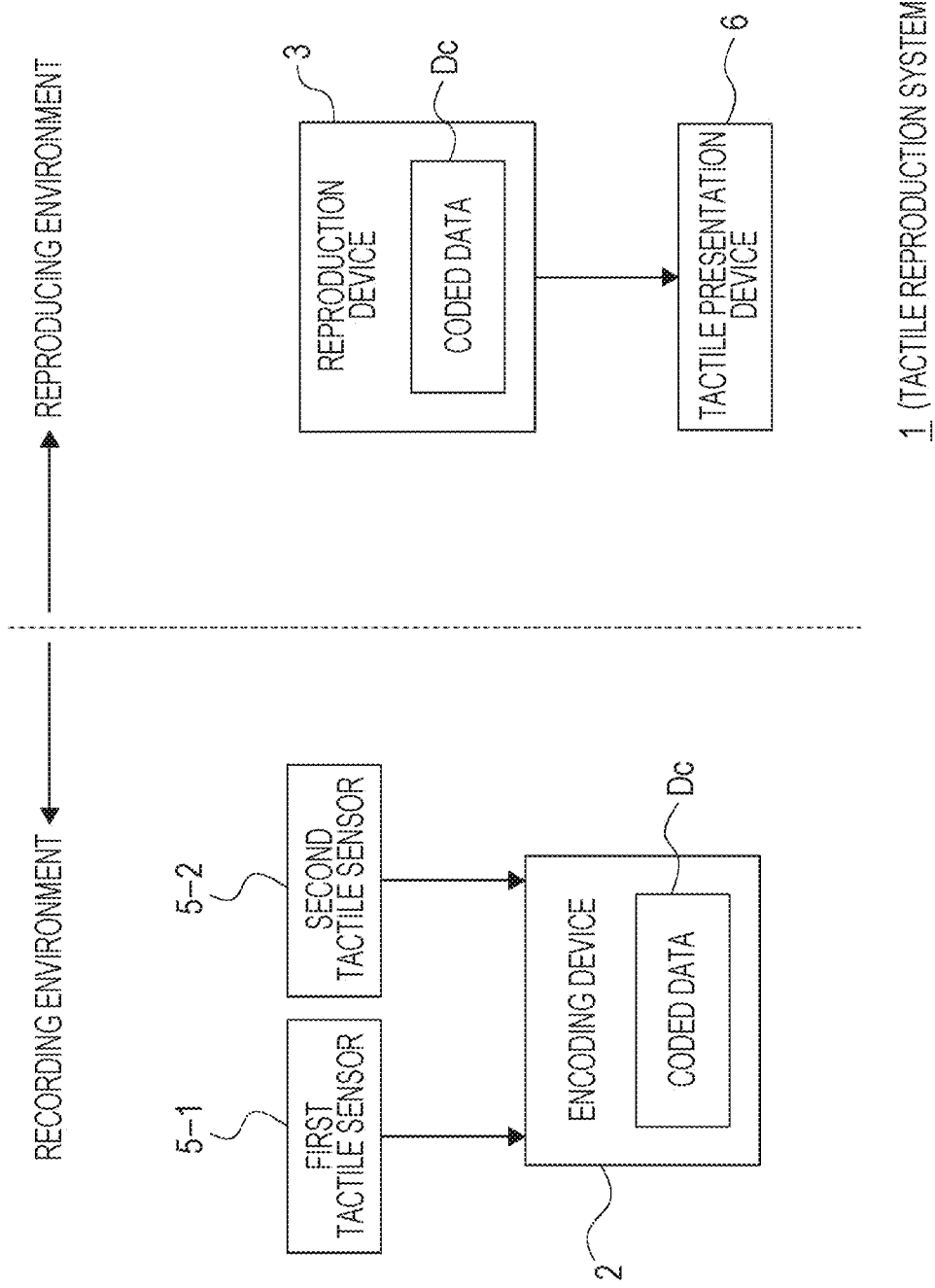
FIG. 1 is a view illustrating a configuration example of a tactile reproduction system including a decoding device as an embodiment according to the present technology.

FIG. 1 illustrates a configuration example of a tactile reproduction system 1 including a decoding device (reproduction device 3) as an embodiment according to the present technology.

First, in this embodiment, an environment for realizing tactile reproduction is provided with a recording environment of encoding a tactile signal obtained by sensing target tactile information (tactile stimulus) and recording coded data Dc obtained by the encoding, and a reproducing environment of reproducing the tactile information on the basis of the tactile signal obtained by decoding the coded data Dc.

As illustrated in the drawing, the tactile reproduction system 1 is provided with, in the recording environment, first and second tactile sensors 5-1 and 5-2 and an encoding device 2 to which the first and second tactile sensors 5-1 and 5-2 are connected, and, in the reproducing environment, a reproduction device 3 configured to be able to acquire the coded data Dc and a tactile presentation device 6 connected to the reproduction device 3.

The first and second tactile sensors 5-1 and 5-2 are sensors that sense tactile stimulus, and vibration sensors such as a piezo pickup and an acceleration sensor are used in this example. In this example, the first and second tactile sensors 5-1 and 5-2 are used in contact with a target to be sensed, and output vibration and motion as a change in voltage.

Note that, in this example, the first and second tactile sensors 5-1 and 5-2 output detection signals representing different physical amounts, and this is described later.

Furthermore, as the first and second tactile sensors 5-1 and 5-2, a sensor that performs non-contact sensing with the target may also be used.

The encoding device 2 provided with a computer device such as a central processing unit (CPU) and a digital signal processor (DSP), for example, to which detection signals (tactile signals) by the first and second tactile sensors 5-1 and 5-2 are input records the coded data Dc obtained by encoding the same according to a predetermined data format in, for example, an internally provided storage device.

The reproduction device 3 provided with a computer device such as a CPU and a DSP decodes the acquired coded data Dc and drives the tactile presentation device 6 on the basis of the tactile signal obtained by the decoding. For example, the coded data Dc recorded in the recording environment is acquired by the reproduction device 3 via a required network such as the Internet. Alternatively, the coded data Dc may be recorded on a portable recording medium, and the reproduction device 3 may acquire the coded data Dc via the recording medium.

The tactile presentation device 6 is a device that generates a tactile stimulus, and in this example, a vibration device such as a vibrator and an actuator is used.

In this example, the tactile presentation device 6 is attached to a predetermined site of a body of a receiving person so as to reproduce the tactile stimulus sensed in the recording environment.

Note that, as the tactile presentation device 6, it is also possible to use a device that performs tactile presentation in a state not attached to the receiving person.

The tactile reproduction system 1 illustrated in FIG. 1 is configured as a system capable of supporting also a case where the recording environment and the reproducing environment are located remotely.

Note that although FIG. 1 illustrates an example in which the tactile presentation device 6 is provided separately from the reproduction device 3, the tactile presentation device 6 may also be integrally formed with the reproduction device 3. Specifically, for example, there may be a configuration in which the vibration device is built in a portable terminal such as a smartphone and the like.

2. CONFIGURATION OF ENCODING DEVICE

Figure 2:
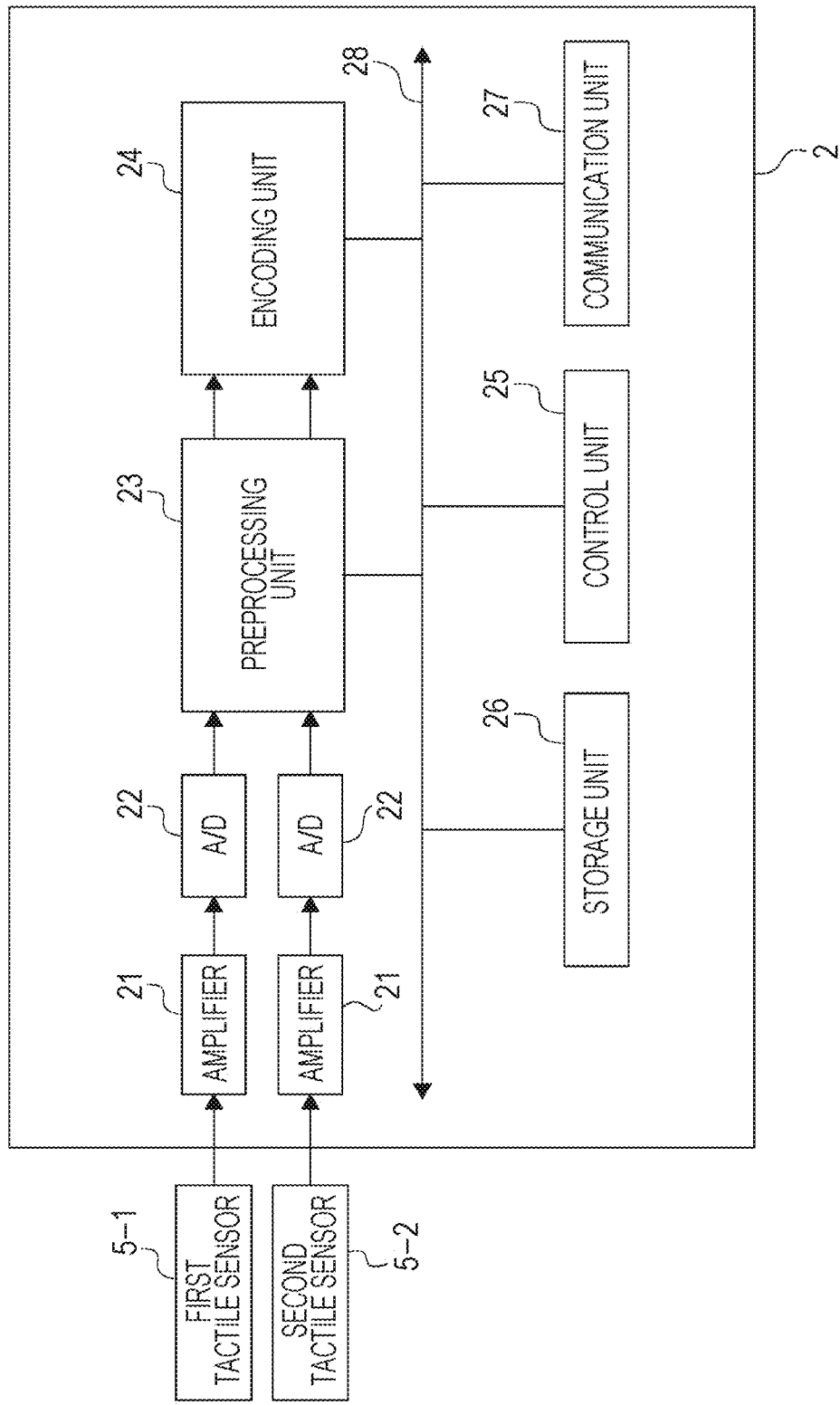
FIG. 2 is a view for illustrating an inner configuration example of an encoding device as the embodiment.

FIG. 2 is a view for illustrating an inner configuration example of the encoding device 2. Note that FIG. 2 illustrates the inner configuration example of the encoding device 2 together with the first and second tactile sensors 5-1 and 5-2 illustrated in FIG. 1.

As illustrated in the drawing, the encoding device 2 is provided with an amplifier 21 and an A/D converter 22 for each of the first and second tactile sensors 5-1 and 5-2, as well as a preprocessing unit 23, an encoding unit 24, a control unit 25, a storage unit 26, a communication unit 27, and a bus 28. The preprocessing unit 23, the encoding unit 24, the control unit 25, the storage unit 26, and the communication unit 27 are connected to each other via the bus 28 so that data communication may be performed.

The detection signals of the first and second tactile sensors 5-1 and 5-2 are input to the corresponding amplifiers 21 to be adjusted to have an appropriate dynamic range, and then input to the corresponding A/D converters 22 to be subjected to analog/digital conversion (A/D conversion).

Each detection signal subjected to the A/D conversion (that is, a tactile signal representing a tactile stimulus pattern) is input to the preprocessing unit 23. The preprocessing unit 23 performs various types of digital signal processing such as noise removal and calibration of sensor characteristics of the first and second tactile sensors 5-1 and 5-2.

Each tactile signal subjected to the signal processing by the preprocessing unit 23 is input to the encoding unit 24. The encoding unit 24 includes, for example, a DSP, encodes the input tactile signal according to a predetermined data format, and obtains the above-described coded data Dc.

Note that the encoding of the tactile signal as this embodiment is described later again.

The control unit 25 is provided with a microcomputer including a CPU, a read only memory (ROM), a random access memory (RAM) and the like, for example, and executes processing according to a program stored in the ROM to perform entire control of the encoding device 2.

For example, the control unit 25 performs data communication with an external device via the communication unit 27.

The communication unit 27 is configured to be able to perform the data communication with the external device via a network such as the Internet, and the control unit 25 may perform the data communication with the external device connected to the network via the communication unit 27. Especially, the coded data Dc obtained by the encoding unit 24 may be transmitted to the external device via the communication unit 27.

The storage unit 26 comprehensively represents a storage device such as a hard disk drive (HDD) and a solid state drive (SSD), for example, and is used for storing various data in the encoding device 2. For example, the storage unit 26 stores data necessary for control by the control unit 25. Furthermore, the coded data Dc obtained by the encoding unit 24 may be stored in the storage unit 26 on the basis of the control of the control unit 25.

3. CONFIGURATION OF DECODING DEVICE

Figure 3:
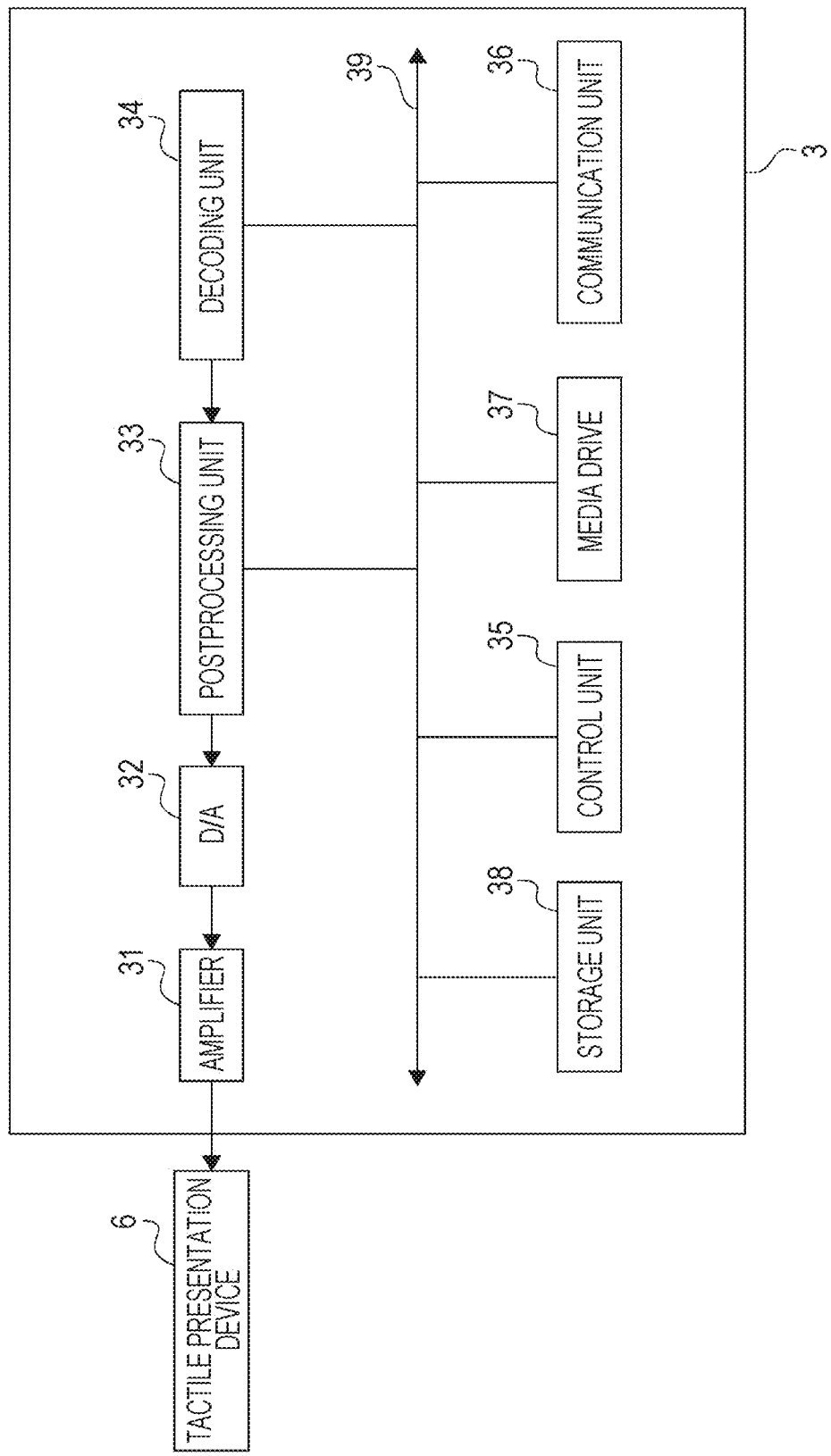
FIG. 3 is a view for illustrating an inner configuration example of a decoding device as the embodiment.

FIG. 3 is a view for illustrating an inner configuration example of the reproduction device 3 in which the tactile presentation device 6 illustrated in FIG. 1 is illustrated together with the inner configuration example of the reproduction device 3. The reproduction device 3 is an embodiment of a decoding device according to the present technology.

As illustrated in the drawing, the reproduction device 3 is provided with an amplifier 31, a D/A converter 32, a postprocessing unit 33, and a decoding unit 34, as well as a control unit 35, a communication unit 36, a media drive 37, a storage unit 38, and a bus 39. The postprocessing unit 33, the decoding unit 34, the control unit 35, the communication unit 36, the media drive 37, and the storage unit 38 are connected via the bus 39 to each other so that data communication may be performed.

The control unit 35 is provided with a microcomputer including a CPU, a ROM, a RAM and the like, for example, and executes processing according to a program stored in the ROM to perform entire control of the reproduction device 3.

The communication unit 36 is configured to be able to perform data communication with an external device via the network such as the Internet. The control unit 35 may perform the data communication with the external device connected to the network via the communication unit 36. Especially, this may allow the communication unit 36 to receive the coded data Dc from the external device such as a server device on the network.

The media drive 37 is configured as a reader/writer unit to which a portable recording medium is detachably attached capable of writing/reading data on/from the attached recording medium. Examples of the recording medium supported by the media drive 37 may include, for example, a memory card (for example, a portable flash memory), an optical disk recording medium and the like.

The media drive 37 may read the coded data Dc recorded on the portable recording medium.

The storage unit 38 comprehensively represents a storage device such as the HDD and the SSD, for example, and is used for storing various data in the reproduction device 3. For example, the storage unit 38 stores data necessary for control by the control unit 35. Furthermore, on the basis of the control of the control unit 35, the coded data Dc read by the media drive 37 and the coded data Dc received from the external device by the communication unit 36 may be stored in the storage unit 38.

The operation unit 39 comprehensively represents various operators provided on the reproduction device 3, and outputs operation input information corresponding to an operation input to the control unit 35.

The control unit 35 executes processing according to the operation input information. Therefore, the reproduction device 3 realizes an operation according to the operation input.

The coded data Dc is input to the decoding unit 34 on the basis of the control of the control unit 35.

The decoding unit 34 decodes the input coded data Dc by a method described later to obtain the tactile signal. The tactile signal obtained by the decoding unit 34 is input to the postprocessing unit 33.

The postprocessing unit 33 performs signal processing such as calibration of the tactile presentation device 6 and predetermined filter processing on the input tactile signal as necessary.

The tactile signal after passing through the postprocessing unit 33 is input to the D/A converter 32 and is subjected to the digital/analog conversion (D/A conversion), adjusted to have an appropriate dynamic range by the amplifier 31, and output to the tactile presentation device 6.

Therefore, the tactile presentation device 6 is driven on the basis of the tactile signal, and the tactile stimulus as the sensing target in the recording environment may be provided to the received person (that is, the tactile information may be reproduced).

Note that although only the tactile signal is described above, it is also possible to configure to record an audio signal and a video signal together with the tactile signal and provide sound and video together with the tactile information to the received person.

4. TACTILE REPRODUCTION METHOD AS EMBODIMENT

4-1. First Example

In a first example, consider a case where a seller presents a texture of a product to a buyer in online shopping. In the tactile reproduction system 1 in this case, in the recording environment, the tactile signals obtained by sensing the texture of the product by the first and second tactile sensors 5-1 and 5-2 are encoded by the encoding device 2, and in the reproducing environment, the tactile presentation device 6 attached to the receiving person as the buyer is driven on the basis of the tactile signal obtained by decoding the coded data Dc obtained by the encoding by the reproduction device 3.

At that time, the tactile presentation device 6 used on the buyer side is not necessarily of the same type and a system may allow mixture of different types tactile presentation devices 6 corresponding to different physical amounts; for example, the tactile presentation device 6 of a certain buyer is a device that operates in response to the tactile signal representing acceleration, the tactile presentation device 6 of another buyer is a device that operates in response to the tactile signal representing displacement and the like.

In a case where the mixture of the different types of tactile presentation devices 6 is allowed in this manner, in order to be able to appropriately drive each type of tactile presentation device 6, it is considered that a plurality of tactile signals representing various physical amounts is included in the coded data Dc; however, in this case, an information amount (data amount) of the coded data Dc is enormous, which leads to an increase in system load.

Therefore, an object of this embodiment is to reduce the data amount required for the tactile presentation while enabling driving of the different types of tactile presentation devices 6 corresponding to different physical amounts.

Figure 4:
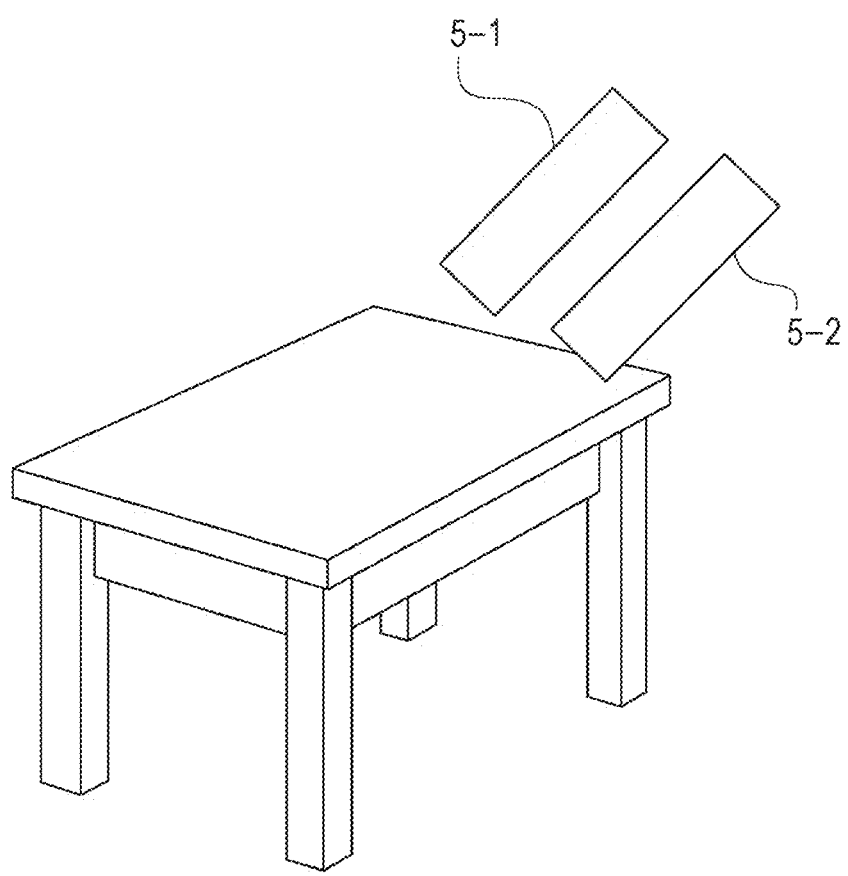
FIG. 4 is a view illustrating an example of a recording environment in a first example.

FIG. 4 illustrates an example of the recording environment in the first example.

In the first example, for example, the texture of the product as a table is sensed by a plurality of tactile sensors as the first and second tactile sensors 5-1 and 5-2.

Specifically, in this example, the first tactile sensor 5-1 is the tactile sensor of a type that outputs a detection signal representing acceleration such as a piezoelectric element (piezo pickup), and the second tactile sensor 5-2 is the tactile sensor of a type that outputs a detection signal representing displacement such as a lased displacement meter. In this case, the tactile signal representing acceleration is obtained by tracing the product with an instrument equipped with the first tactile sensor 5-1, and the tactile signal representing displacement (displacement in product surface) is obtained by tracing the product with an instrument equipped with the second tactile sensor 5-2.

Here, focusing on the fact that the acceleration is a value that should be obtained by applying second-order derivation to the displacement and the displacement is a value that should be obtained by applying second-order integration to the acceleration, the signal of acceleration is included in the coded data Dc as it is, whereas as the signal of displacement, a value of a difference from the second-order integral value of the acceleration is included in the coded data Dc in place of an entire signal.

Moreover, in the coded data Dc, one or more samples of a reference value of displacement and a reference value of speed are stored as information for decoding.

As the reference value of displacement, a sample value of the tactile signal by the second tactile sensor 5-2 is stored. The reference value of speed may be acquired on the basis of the sample value (that is, a value of displacement) of the tactile signal by the second tactile sensor 5-2. Specifically, this is acquired as a difference value between a plurality of samples of displacement. Note that as the reference value of speed, a value detected by a sensor for speed detection prepared separately from the first and second tactile sensors 5-1 and 5-2 in the recording environment may also be used.

The larger the number of samples of reference values of displacement and speed, the smaller the difference from the integral value may be controlled, so that this may be changed according to allowance of the information amount.

As described above, in this example, two systems of signals of acceleration and displacement are not included in the coded data Dc as they are; as for the acceleration, the signal detected by the first tactile sensor 5-1 is included as it is, but as for the signal of displacement, a signal of a difference between the signal of displacement detected by the second tactile sensor 5-2 and the two-stage integration of the signal of acceleration detected by the first tactile sensor 5-1 is included.

Since the signal of the difference from the second-order integration requires a code length shorter than that of the entire signal, the information amount may be reduced as compared with a case where the signals of the two systems are included in the coded data Dc as they are.

Hereinafter, the signal to be included in the coded data Dc as it is such as the signal of acceleration in the above description is referred to as an "original signal", and the signal of which difference from a physical amount converted signal of the original signal is obtained as the signal of displacement is referred to as a "signal of which difference is obtained". Moreover, the signal representing the difference between the "signal of which difference is obtained" and the "physical amount converted signal of the original signal" such as the signal of the difference between the signal of displacement and the second-order integration of the acceleration in the description above is referred to as a "difference signal".

Next, a method of tactile presentation in the reproducing environment is described.

In the reproducing environment, for example, there is a case where a device driven by acceleration information such as a piezoelectric element is used, and a case where a device driven by displacement information such as a pin array is used as the tactile presentation device 6.

In a case where the tactile presentation device 6 is the device driven by the acceleration information, the tactile presentation device 6 is driven by using the signal representing the acceleration in the coded data Dc as it is.

On the other hand, in a case where the tactile presentation device 6 is the device driven by the displacement information, a decoding process of the displacement is performed on the basis of the signal of acceleration and the difference signal in the coded data Dc. Specifically, first, the speed is obtained by using a result of an integration operation of the acceleration and the reference value of speed, and further, the displacement signal as the second-order integral value of the acceleration is obtained by using a result of an integration operation of the speed and the reference value of displacement. Then, the difference signal is added to this displacement signal. Therefore, an error caused by conversion may be corrected, and a displacement signal extremely close to the displacement signal obtained by sensing by the displacement sensor (second tactile sensor 5-2) may be obtained.

Here, if reduction in data amount is prioritized, it is also possible that the coded data Dc includes only the acceleration signal, and the tactile presentation device 6 is driven by the displacement signal obtained by performing second-order integration on this. However, since the integration operation is strongly influenced by a DC component of the signal, in a case where a noise is mixed in the acceleration signal, it is possible that the displacement becomes a value greatly different from an original value, so that correct tactile reproduction cannot be performed. It is possible to avoid this problem by applying an appropriate frequency filter, but as tactile information by displacement, there is a lot of effective information also in the vicinity of the DC component, so that, when the DC component is removed by the above-described frequency filter, it may become impossible to reproduce effective tactile information such as a gradual change in shape of the product surface, for example.

In the tactile reproduction method as the above-described embodiment, it is possible to obtain the correct tactile signal in which the effective tactile information is prevented from being lost by not applying such frequency filter to the physical amount converted signal but correcting the same based on the difference signal, so that correctness may be improved in tactile reproduction.

Figure 5:
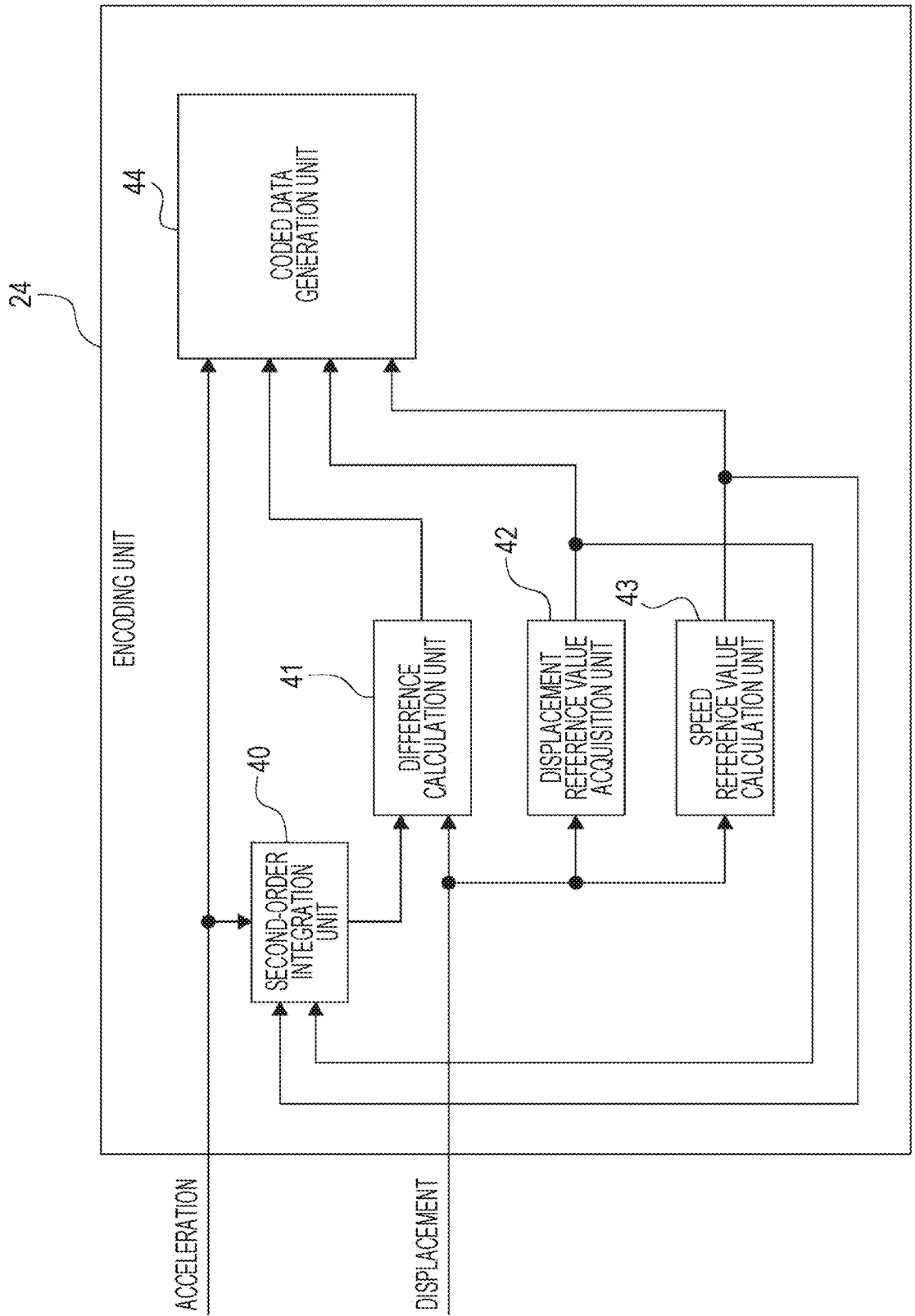
FIG. 5 is a view illustrating a configuration of the encoding unit corresponding to the first example.

FIG. 5 is a view illustrating a configuration of the encoding unit 24 corresponding to the first example.

As illustrated in the drawing, the encoding unit 24 is provided with a second-order integration unit 40, a difference calculation unit 41, a displacement reference value acquisition unit 42, a speed reference value calculation unit 43, and a coded data generation unit 44.

In the encoding unit 24, the tactile signal representing the acceleration is input to the second-order integration unit 40 and the coded data generation unit 44. Here, the tactile signal representing the acceleration is detected by the first tactile sensor 5-1 and input to the encoding unit 24 via the preprocessing unit 23 in this example.

Furthermore, in the encoding unit 24, the tactile signal representing the displacement is input to the difference calculation unit 41, the displacement reference value acquisition unit 42, and the speed reference value calculation unit 43. In this example, the tactile signal representing the displacement is detected by the second tactile sensor 5-2 and input to the encoding unit 24 via the preprocessing unit 23.

Note that, hereinafter, the tactile signal representing the acceleration is referred to as an "acceleration signal", and the tactile signal representing the displacement is referred to as a "displacement signal" sometimes.

The displacement reference value acquisition unit 42 acquires a sample value of the displacement signal as the reference value of displacement, and outputs the acquired reference value of displacement to the second-order integration unit 40 and the coded data generation unit 44.

The speed reference value calculation unit 43 acquires the reference value of speed by calculating a difference between a plurality of samples of the displacement signal, and outputs the acquired reference value of speed to the second-order integration unit 40 and the coded data generation unit 44.

The second-order integration unit 40 performs an integration operation on the acceleration signal and obtains a signal representing the speed (hereinafter, also referred to as a "speed signal") on the basis of a result of the integration operation and the reference value of speed, and performs an integration operation on the speed signal and obtains a signal representing the displacement on the basis of a result of the integration operation and the reference value of displacement. The tactile signal representing the displacement obtained by the second-order integration on the acceleration signal in this manner is referred to as a "physical amount converted signal to displacement".

The second-order integration unit 40 outputs the physical amount converted signal to displacement to the difference calculation unit 41.

The difference calculation unit 41 calculates a difference between the displacement signal and the physical amount converted signal to displacement to obtain a difference signal, and outputs the difference signal to the coded data generation unit 44.

The coded data generation unit 44 encodes the input acceleration signal, difference signal, reference value of speed, and reference value of displacement according to a predetermined data format, and generates the coded data Dc. A specific example of an encoding format adopted in this embodiment is described later.

Note that a configuration and processing on the decoding side are similar to those in a second example to be described hereinafter, so that they are described later.

4-2. Second Example

A second example is an example in which, in a movie, a tactile sense such as actually recorded vibration is presented to an audience in addition to video and sound.

In this example, sensing of tactile information is performed as tactile recording in a manner similar to that of video shooting and audio recording at a movie shooting stage. A plurality of physical amounts representing the tactile sense wanted to be presented to the audience is obtained as detection signals of dedicated sensors. For example, an inertial sensor (acceleration sensor) attached to an actor's body measures acceleration, and a distance measuring sensor measures magnitude of body motion, that is, displacement.

Here, focusing on an interconversion property by second-order calculus between acceleration and displacement, a signal of displacement is included in coded data Dc as it is, and as for a signal of acceleration, a value of a difference from a second-order differential value of the displacement is included in place of an entire signal.

Specifically, in this example also, supposing that a first tactile sensor 5-1 is a device of a type that outputs a detection signal representing the acceleration, and a second tactile sensor 5-2 is a device of a type that outputs a detection signal representing the displacement, in the coded data Dc in this case, the signal detected by the second tactile sensor 5-2 is included as it is for the displacement, whereas a difference signal representing a difference between the signal of acceleration detected by the first tactile sensor 5-1 and the second-order differentiation of the signal of displacement detected by the second tactile sensor 5-2 is included as the signal of acceleration.

When performing tactile presentation on the basis of such coded data Dc, the type of the tactile presentation device 6 might differ depending on a situation in which the audience sees the movie, so that, a decoding method is switched depending on the type of the tactile presentation device 6.

For example, in a case where the tactile presentation device 6 is the device driven by displacement information, the tactile presentation device 6 is driven by using the displacement signal included in the coded data Dc as it is.

On the other hand, in a case where the tactile presentation device 6 is the device driven by acceleration information, a decoding process of the acceleration is performed. Specifically, first, second-order differentiation of the displacement signal included in the coded data Dc is performed, and further, the difference signal included in the coded data Dc is added to a signal obtained by the second-order differentiation. Therefore, it is possible to appropriately correct an error (error from the actually detected acceleration signal) occurring in the signal obtained by the second-order differentiation of the displacement.

Here, if the displacement signal is included in the coded data Dc as in this example, the tactile presentation device 6 corresponding to the acceleration may be driven by using the acceleration signal obtained by the second-order differentiation of the displacement signal, but since the differentiation operation is strongly affected by high-frequency noise, it is possible that the high-frequency noise in the finally presented signal is greatly amplified and correct tactile presentation cannot be performed.

In this example, the acceleration signal obtained by the second-order differentiation of the displacement signal is not used as it is, but error correction based on the difference signal is performed, so that the correct tactile presentation may be performed.

Furthermore, in the second example, a process of adjusting the amplitude of the tactile signal is performed in consideration of a physical characteristic of the tactile presentation device 6 itself.

Figure 6:
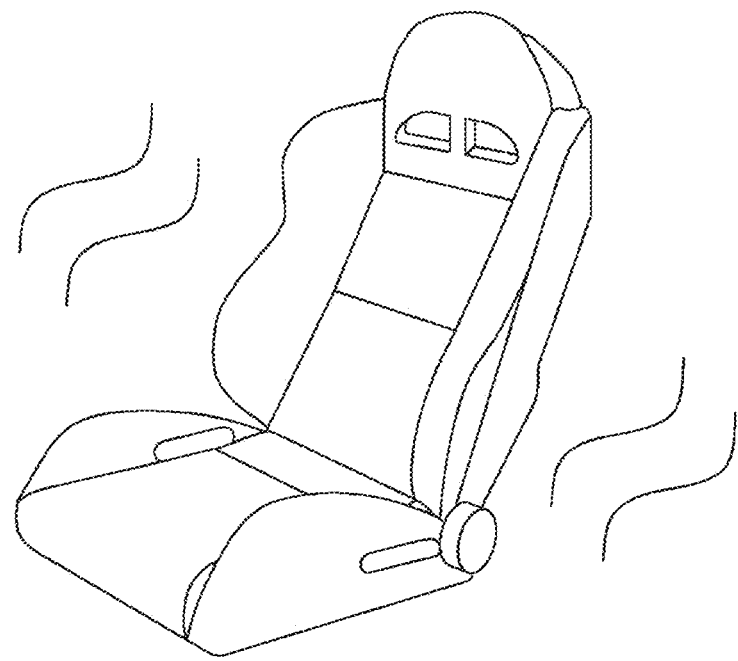
FIG. 6 is a view for illustrating an example of a tactile presentation device used in a second example.
Figure 7:
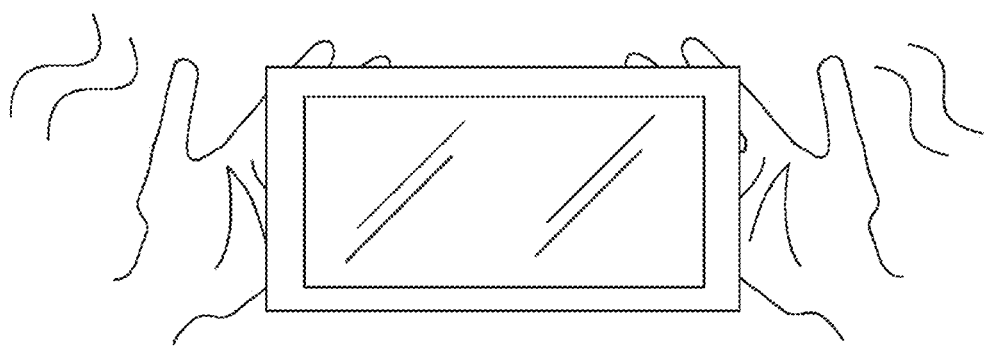
FIG. 7 is a view for illustrating another example of the tactile presentation device used in the second example.

Specifically, as the tactile presentation device 6 used in the reproducing environment in the second example, supposed are a case of a relatively large-power displacement driving device such as a linear motor that vibrates seats in a movie theater as illustrated in FIG. 6, and a case of a small-power acceleration driving device such as a piezoelectric element mounted on a portable terminal such as a smartphone as illustrated in FIG. 7.

In the second example, the reproduction device 3 (decoding unit 34) adjusts the amplitude of the tactile signal according to the physical characteristic of such tactile presentation device 6. Specifically, for example, in the case of FIG. 6, it is adjusted such that the amplitude of the tactile signal becomes larger than that in the case of FIG. 7.

With a tactile reproduction system 1 as the second example as described above, a filmmaker may record without considering about a type of the tactile presentation device 6 to be used in a reproducing environment, and may compress a data amount of the coded data Dc without greatly impairing the information. Furthermore, the user as a receiving person may enjoy a more powerful movie because a tactile stimulus is added to the video and sound.

Figure 8:
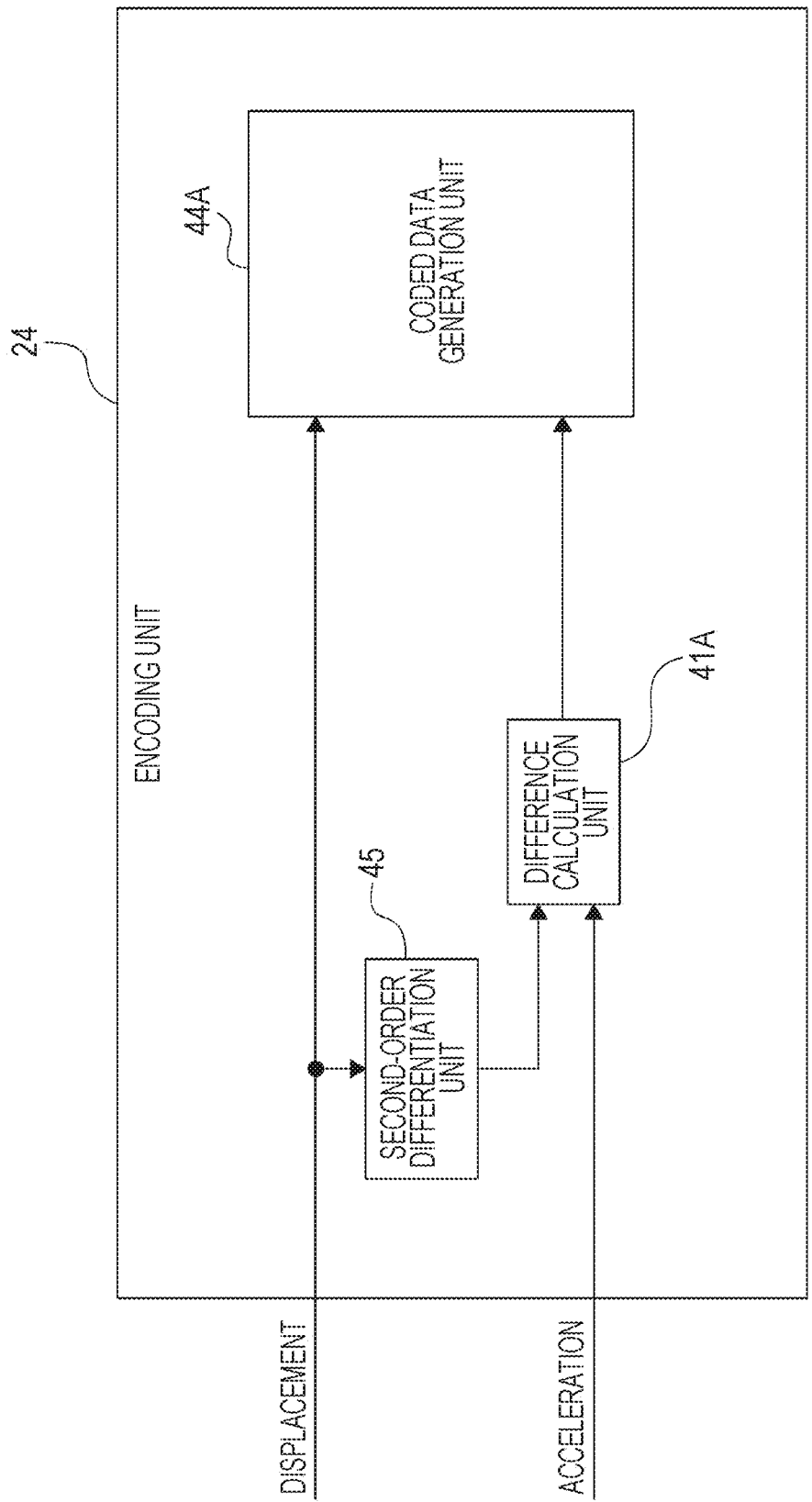
FIG. 8 is a view illustrating a configuration of an encoding unit corresponding to the second example.

FIG. 8 is a view illustrating a configuration of an encoding unit 24 corresponding to the second example.

As illustrated in the drawing, the encoding unit 24 in this case is provided with a second-order differentiation unit 45, a difference calculation unit 41A, and a coded data generation unit 44A.

In this case, the displacement signal is input to the coded data generation unit 44A and the second-order differentiation unit 45, and the acceleration signal is input to the difference calculation unit 41A.

The second-order differentiation unit 45 performs the second-order differentiation on the displacement signal to obtain a physical amount converted signal to acceleration.

The difference calculation unit 41A to which the physical amount converted signal to acceleration obtained by the second-order differentiation unit 45 is input calculates a difference between the acceleration signal and the physical amount converted signal to the acceleration to obtain a difference signal.

The coded data generation unit 44A encodes the displacement signal and the difference signal obtained by the difference calculation unit 41A according to a predetermined data format to generate the coded data Dc.

4-3. Example of Encoding Format

Figure 9:
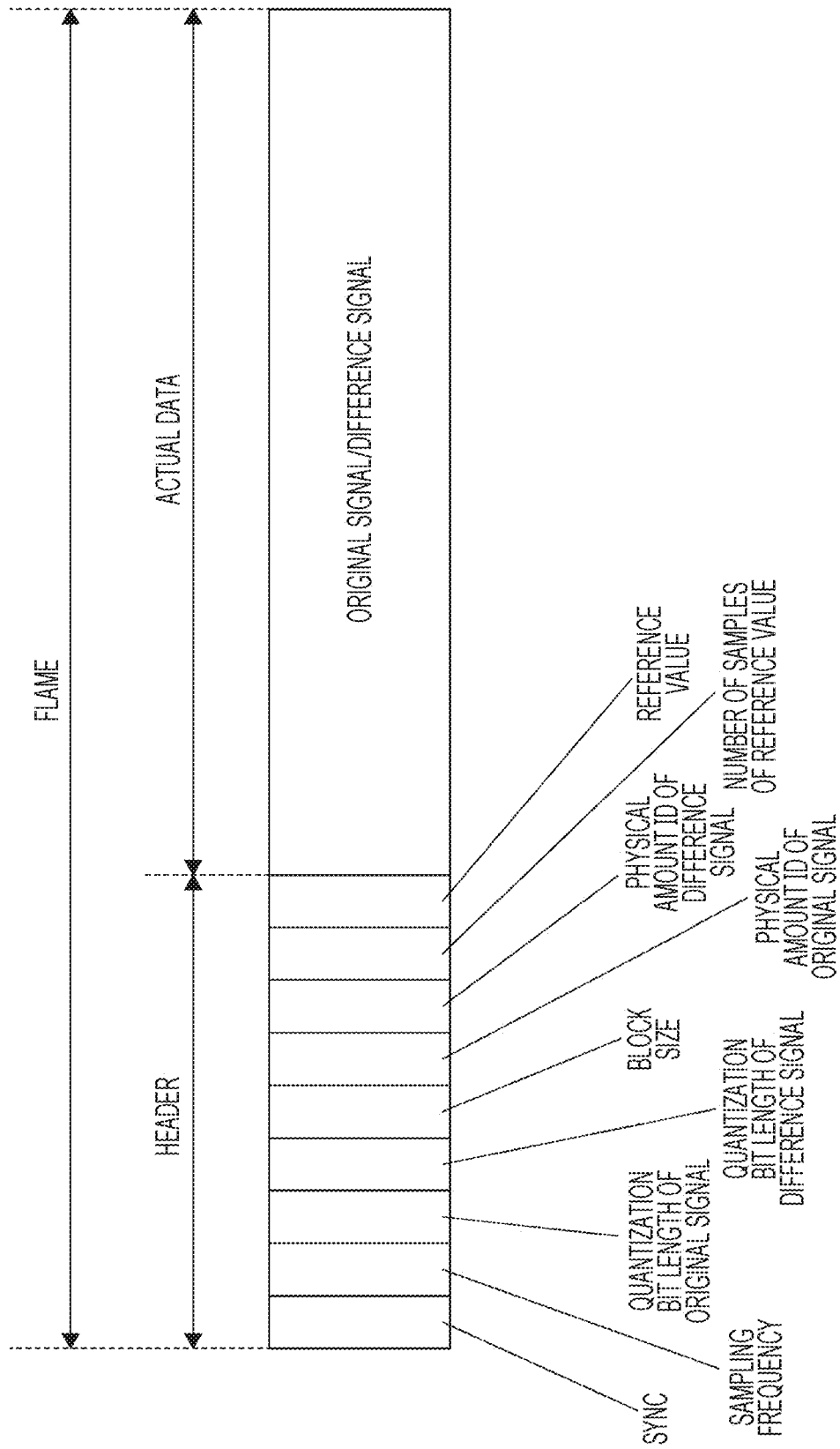
FIG. 9 is a view illustrating an example of an encoding format in the embodiment.

FIG. 9 illustrates an example of the encoding format in this embodiment.

Here, as a digital tactile signal, that obtained by sampling a time-series voltage change obtained by the tactile sensor at a predetermined sampling frequency similar to that obtained by a linear pulse code modulation (LPCM) method in an audio signal is supposed. In the encoding in this example, such digital tactile signal is divided into frames suitable for transmission in a time direction, and a header (frame header) is added as additional information for each frame.

Specifically, a data format illustrated in FIG. 9 is considered.

Note that, although an example in which the "original signal" and the "signal of which difference is obtained" are in a relationship of second-order calculus is described in the first and second examples described above, the "original signal" and the "signal of which difference is obtained" may also be in a relationship of first-order calculus. Specifically, there are a case where the original signal is the displacement and the signal of which difference is obtained is the speed, a case where the original signal is the speed and the signal of which difference is obtained is the acceleration, a case where the original signal is the acceleration and the signal of which difference is obtained is the speed, and a case where the original signal is the speed and the signal of which difference is obtained is the displacement.

A format illustrated in FIG. 9 may also support a case where the "original signal" and the "signal of which difference is obtained" are in the first-order calculus relationship.

As illustrated in the drawing, one frame includes a header region for storing information as the frame header and an actual data region for storing actual data of the tactile signal.

The tactile signal as the original signal and the difference signal are stored in the actual data region.

In the frame header, regions for storing each information such as "sync", "sampling frequency", "quantization bit length of original signal", "quantization bit length of difference signal", "block size", "physical amount ID of original signal", "physical amount ID of difference signal", "number of samples of reference value", and "reference value" are defined in this order from the beginning.

"Sync" is an identifier representing the beginning of the frame and data of a predetermined pattern is stored. "Sampling frequency" represents sampling frequencies of the original signal and the difference signal. The quantization bit lengths of the original signal and the difference signal represent the quantization bit length per sample of the original signal and that of the difference signal, respectively.

"Block size" represents a size (number of samples) of the original signal and the difference signal stored in the time direction in the frame. The block herein represents a processing unit in the time direction of the original signal and the difference signal.

"Physical amount ID of original signal" and "physical amount ID of difference signal" are identifiers for identifying to which of the physical amounts out of acceleration, speed, and displacement the original signal and the difference signal correspond, respectively. Here, as "physical amount ID of difference signal", in a case where the "signal of which difference is obtained" is the displacement signal as in the first example, an ID representing "displacement" is stored, and in a case where the "signal of which difference is obtained" is the acceleration signal as in the second example, an ID representing "acceleration" is stored.

The physical amount ID may be, for example, 2-bit information, and "00" may be assigned to the acceleration, "01" may be assigned to the speed, and "10" may be assigned to the displacement, for example.

As "number of samples of reference value", the number of samples of the reference value of each of the speed and the displacement used in a case where the decoding side requires an integration operation of the original signal is stored. In this example, as "number of samples of reference value", a value equal to the number of stages of integration operation that might be performed on the decoding side is stored; for example, "0" is stored in a case where the integration operation on the original signal is not performed and only the differentiation operation is performed as in the second example, and "2" is stored in a case where the integration operation of the two stages on the original signal is required as in the first example.

As "reference value", the reference values of the number of samples stored in "number of samples of reference value" are stored. The bit length required for this "reference value" is determined by the "quantization bit length of original signal" and the "number of samples of reference value". For example, in a case where the quantization bit length of the original signal is eight bits, the reference value is also recorded by eight bits, and in a case where "number of samples of reference value" is "2", 16 bits are assigned to "reference value". At that time, in "reference value", in a case where the second-order integration is required, the reference values are stored in the order of the reference value of speed and the reference value of displacement.

By the encoding of this embodiment, stream data may be obtained in a mode in which frames having the above-described data structure are arranged in the time direction. The coded data Dc described above is recorded and transmitted in the mode of such stream data.

Note that, although the description by illustration is omitted, in the stream data, the data in the actual data region is actually interleaved to be stored for each of the original signal and the difference signal.

The coded data generation units 44 and 44A illustrated in FIGS. 5 and 8 generate the coded data Dc according to such encoding format.

4-4. Functional Configuration on Decoding Side

Subsequently, a functional configuration regarding the decoding of the coded data Dc of the reproduction device 3 is described with reference to a functional block diagram of FIG. 10.

Figure 10:
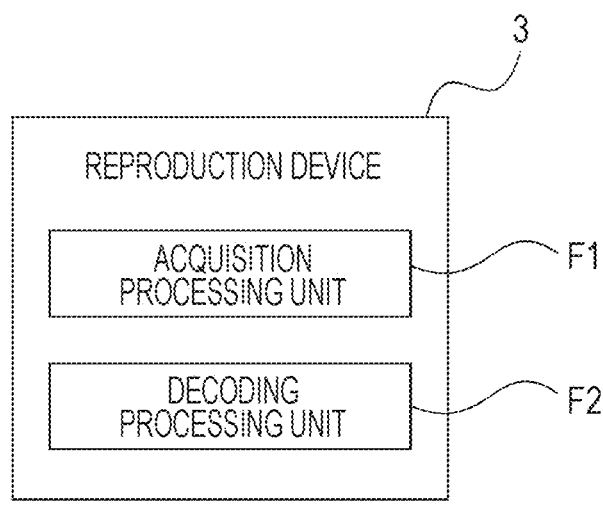
FIG. 10 is a functional block diagram illustrating a functional configuration regarding decoding of coded data in a decoding device as the embodiment.

As illustrated in FIG. 10, the reproduction device 3 has functions as an acquisition processing unit F1 and a decoding processing unit F2 as functions regarding the decoding of the coded data Dc.

The acquisition processing unit F1 acquires the coded data Dc generated by performing the encoding to compress the information amount by utilizing the interconversion property between the physical amounts for a plurality of tactile signals representing different physical amounts.

In this embodiment, the function as the acquisition processing unit F1 corresponds to a function that the communication unit 36 and the media drive 37 acquire the coded data Dc.

The decoding processing unit F2 decodes the coded data Dc acquired by the acquisition processing unit F1 to obtain the tactile signal. This function as the decoding processing unit F2 is realized by the decoding unit 34 in this embodiment.

Here, in this embodiment, the coded data Dc includes a specific signal (original signal) which is a tactile signal representing a specific physical amount and error information indicating a conversion error when the specific signal is converted into a signal representing another physical amount.

Then, the decoding processing unit F2 converts the specific signal into a tactile signal representing another physical amount, and corrects the converted tactile signal on the basis of the error information.

Specifically, in this embodiment, the above-described error information is made difference information (difference signal) indicating a difference value between the specific signal and the tactile signal representing another physical amount.

By converting the specific signal into the tactile signal representing another physical amount and correcting the converted tactile signal on the basis of the error information as described above, it becomes not necessary that the coded data Dc includes the signal itself as for the tactile signal representing the physical amount other than the physical amount of the specific signal (represented as "specific physical amount") (the displacement signal in the first example and the acceleration signal in the second example). Then, by performing the correction on the basis of the error information described above, it becomes possible to correctly obtain the tactile signal representing the physical amount other than the specific physical amount.

Therefore, it is possible to reduce the data amount required for the tactile presentation while realizing the correct tactile reproduction.

Furthermore, since the error information is made the difference signal, the error correction regarding the converted signal of the specific signal may be realized by a simple process of adding the difference value indicated by the difference information to the converted signal of the specific signal, so that it is possible to reduce a processing load when realizing the correction of the conversion error.

Furthermore, in this embodiment, the coded data Dc includes identification information (physical amount ID of original signal) for identifying the physical amount represented by the specific signal, and the decoding processing unit F2 decodes on the basis of the identification information.

Therefore, it becomes not necessary to perform signal analysis on the specific signal when specifying the physical amount of the specific signal, and it is possible to reduce the processing load of the decoding.

Furthermore, in this embodiment, the decoding processing unit F2 outputs the specific signal in a case where the physical amount of the specific signal specified on the basis of the identification information coincides with a predetermined physical amount.

On the other hand, in a case where the physical amount of the specific signal specified on the basis of the identification information does not coincide with a predetermined physical amount, the decoding processing unit F2 converts the specific signal into a signal representing a predetermined physical amount, and corrects the converted signal on the basis of the error information to output.

Therefore, it becomes possible to appropriately drive the tactile presentation device 6 on the basis of the specific signal corresponding to a case where the physical amount of the specific signal coincides with the physical amount to which the tactile presentation device 6 corresponds, and appropriately drive the tactile presentation device 6 by the signal obtained by correcting the converted signal of the specific signal on the basis of the error information in a case where the physical amount of the specific signal does not coincide with the physical amount to which the tactile presentation device 6 corresponds.

Therefore, it is possible to appropriately drive different types of tactile presentation devices 6 corresponding different physical amounts.

4-5. Decoding Side Procedure

Figure 11:
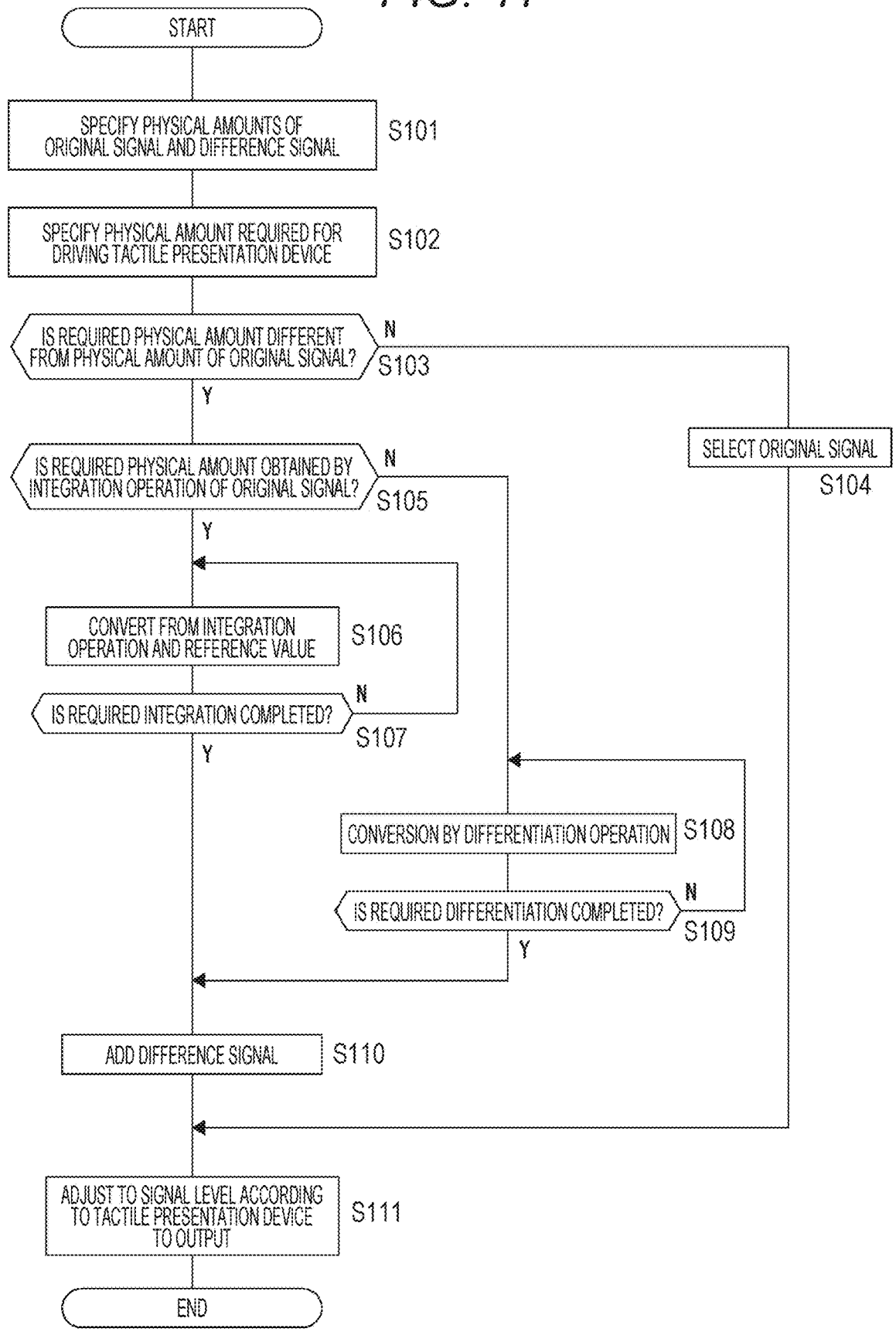
FIG. 11 is a flowchart illustrating a specific procedure that should be executed for realizing a decoding function as the embodiment.

FIG. 11 is a flowchart illustrating a specific procedure that should be executed for realizing a decoding function as the embodiment described above.

Note that processes illustrated in FIG. 11 are executed by the decoding unit 34 for each frame of the coded data Dc.

Here, in FIG. 11, it is assumed that the coded data Dc includes two types of difference signals as the difference signals in order to be able to support the tactile presentation device 6 irrespective of the physical amount out of acceleration, speed, and displacement to which the tactile presentation device 6 corresponds.

Specifically, in a case where the original signal is the acceleration signal as in the first example, as the difference signal, the difference signal for enabling the decoding to the speed signal is included in the coded data Dc together with the difference signal for enabling the decoding of the displacement signal illustrated in the first example. In a case of the first example, in the recording environment, a detection signal by a speed sensor provided separately from the first and second tactile sensors 5-1 and 5-2 is input to the encoding device 2, and the difference signal for enabling the decoding to the speed signal is obtained as a signal of a difference between the detection signal by the speed sensor and a speed converted signal by first-order integration of the acceleration signal (signal obtained by converting the acceleration signal to the speed on the basis of a result of the first-order integration operation and the reference value of speed).

Furthermore, in a case where the original signal is the displacement signal as in the second example, as the difference signal, the difference signal for enabling the decoding to the speed signal is included in the coded data Dc together with the difference signal for enabling the decoding of the acceleration signal illustrated in the second example. In the recording environment, the detection signal by the speed sensor is input to the encoding device 2, and the difference signal for enabling the decoding to the speed signal in a case of the second example is obtained as a signal of a difference between the detection signal by the speed sensor and a speed converted signal by first-order differentiation of the displacement signal.

In FIG. 11, the decoding unit 34 specifies the physical amounts of the original signal and the difference signal at step S101. Specifically, the physical amounts of the original signal and the difference signal are specified on the basis of "physical amount ID of original signal" and "physical amount ID of difference signal" stored in the frame header of the coded data Dc.

At subsequent step S102, the decoding unit 34 specifies the physical amount required for driving the tactile presentation device 6. Note that a specifying process at step S102 may be omitted if the type of the tactile presentation device 6 connected to the reproduction device 3 is fixed.

Next, at step S103, the decoding unit 34 determines whether or not the required physical amount and the physical amount of the original signal are different from each other. In a case where the required physical amount and the physical amount of the original signal are not different from each other, the decoding unit 34 proceeds to step S104 to select the original signal, and the procedure shifts to step S111.

At step S111, a process of adjusting to the signal level according to the tactile presentation device 6 to output the signal is executed. That is, in a case where the procedure shifts from step S104 to step S111, the decoding unit 34 performs an adjusting process of the signal level on the original signal and outputs the same to the postprocessing unit 33 illustrated in FIG. 3. Here, the adjustment of the signal level at step S111 is performed by increasing the amplitude and the like in a case where the tactile presentation device 6 is of large power as illustrated in the second example above.

The decoding unit 34 finishes a series of processes illustrated in FIG. 11 in response to execution of the process at step S111.

As described above, in a case where the tactile presentation device 6 is the device corresponding to the same physical amount as the physical amount of the original signal, the tactile presentation device 6 is driven on the basis of the original signal.

On the other hand, in a case where it is determined at step S103 that the required physical amount and the physical amount of the original signal are different from each other, the decoding unit 34 proceeds to step S105 and determines whether or not the required physical amount is obtained by the integration operation of the original signal.

In a case where it is determined that the required physical amount is obtained by the integration operation of the original signal, the decoding unit 34 proceeds to step S106, performs a process of converting a target signal from the integration operation and the reference value, and then determines whether or not required integration is completed at step S107.

The processes at steps S106 and S107 are executed in each of a case where the obtained physical amount is the displacement or a case where this is the speed in a case where the original signal is the acceleration signal as in the first example.

Specifically, at step S106, first, a first-order integration operation is performed on the original signal as the acceleration signal, and a process of converting the original signal into the speed signal is performed on the basis of a result of the operation and the reference value of speed stored in "reference value" in the frame header of the coded data Dc. In the latter case, since the required integration is of the first-order, a positive result is obtained at step S107 when the process at step S106 is performed once, and the procedure shifts to addition of the difference signal at step S110.

On the other hand, in the former case, since the required integration is of second-order, a negative result is obtained at step S107 when the process at step S106 is performed once, and the process at step S106 is executed again. At step S106 executed again in this manner, a process of converting the signal (speed signal) obtained in the first converting process by the integration operation and the reference value is performed. Specifically, the first-order integration operation is performed on the speed signal obtained in the first converting process, and a process of converting the same into the displacement signal on the basis of a result of the operation and the reference value of displacement stored in "reference value" in the frame header of the coded data Dc is performed.

In the former case, after obtaining the displacement signal by such converting process, the procedure shifts to the addition of the difference signal at step S110.

Furthermore, in a case where it is determined that the required physical amount is not obtained by the integration operation of the original signal at step 105 above, the decoding unit 34 proceeds to step S108, converts the target signal by a differentiation operation, and determines whether or not required differentiation is completed at step S109.

The processes at steps S108 and S109 are executed in each of a case where the required physical amount is the acceleration and a case where this is the speed in a case where the original signal is the displacement signal as in the second example.

Specifically, at step S108, first, the original signal as the displacement signal is converted into the speed signal by the first-order differentiation operation. In the latter case, since the required differentiation is of first-order, a positive result is obtained at step S109 when the process at step S108 is performed once, and the procedure shifts to the addition of the difference signal at step S110.

On the other hand, in the former case, since the required differentiation is of second-order, a negative result is obtained at step S109 when the process at step S107 is performed once, and the process at step S108 is executed again. At step S108 executed again in this manner, the first-order differentiation operation is performed again on the speed signal obtained in the first converting process and the conversion into the displacement signal is performed. In the former case, a positive result is obtained at step S109 when the converting process is performed again, and the procedure shifts to the addition of the difference signal at step S110.

At step S110, the decoding unit 34 adds the difference signal to the target signal. Specifically, the corresponding difference signal stored in the coded data Dc is added to the converted signal as the displacement signal or the speed signal obtained by the processes at steps S106 and S107 described above, or the converted signal as the displacement signal or the speed signal obtained at steps S108 and S109.

The decoding unit 34 proceeds to step S111 described above in response to the execution of the adding process at step S110.

Therefore, in a case where the tactile presentation device 6 is the device corresponding to the physical amount different from the physical amount of the original signal, the tactile presentation device 6 may be driven on the basis of the signal obtained by converting the original signal into the corresponding physical amount and appropriately correcting the conversion error by the difference signal.

5. VARIATION

Here, an example in which the original signal included in the coded data Dc is any one of the acceleration signal and the displacement signal is described above as an example in which the tactile presentation device 6 may support any type of acceleration driving, speed driving, and displacement driving, the original signal may also be a speed signal. In this case, in the coded data Dc, a reference value of displacement is stored as a reference value, and as error information indicating a conversion error, information indicating a conversion error from speed to displacement and information indicating a conversion error from speed to acceleration are stored. A displacement signal is obtained by first-order integration on the speed signal and conversion using the reference value, and an acceleration signal is obtained by first-order differentiation on the speed signal.

Furthermore, although an example of utilizing the conversion property by the calculus operation between acceleration, speed, and displacement is described above, it is not limited to the calculus and encoding and decoding may be performed by a similar procedure between mutually convertible physical amounts.

Figure 12:
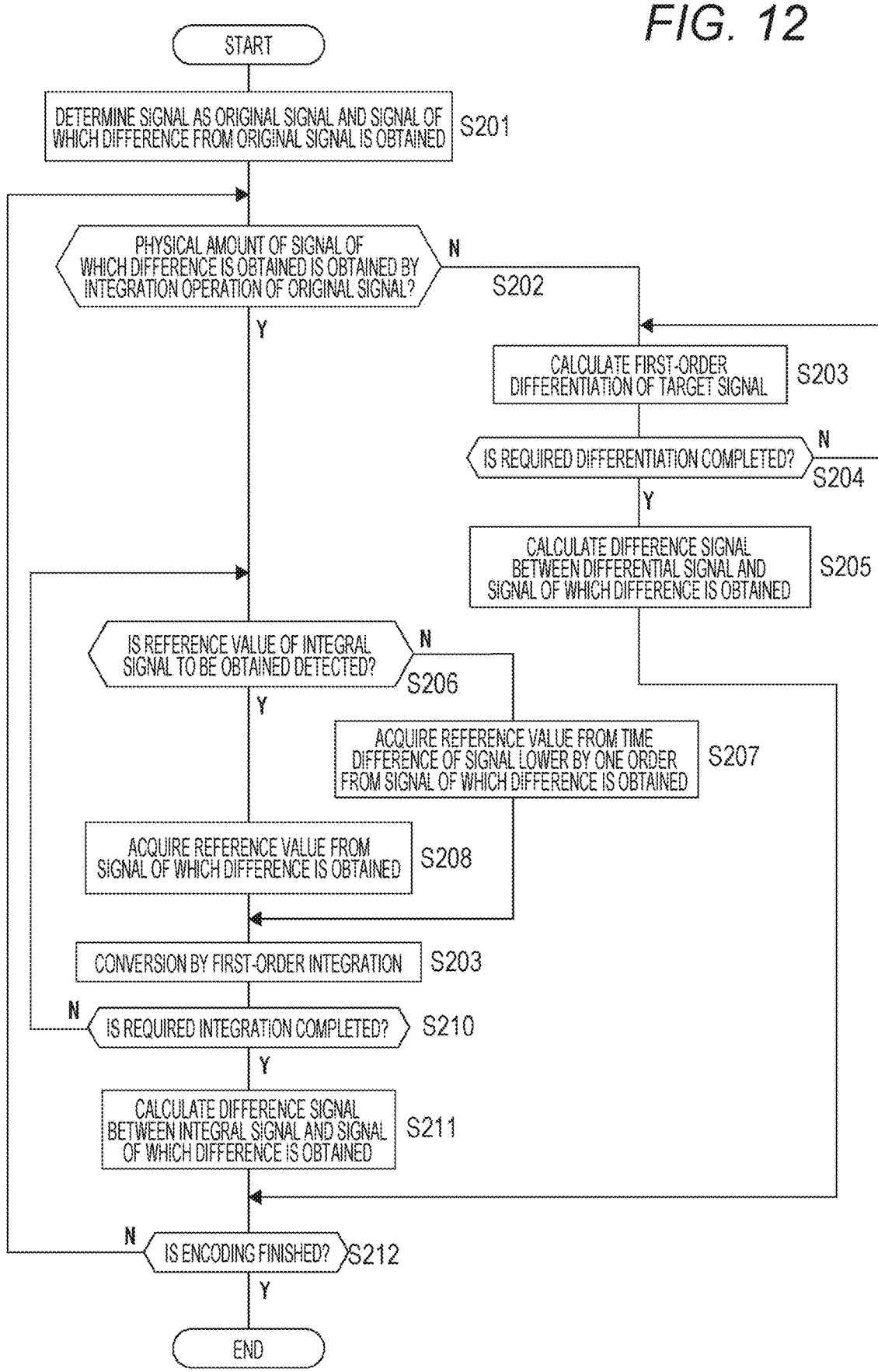
FIG. 12 is a flowchart illustrating an encoding process as a variation.

With reference to a flowchart of FIG. 12, a process of encoding a plurality of signals representing physical amounts that may be mutually converted by a second-order calculus operation at the maximum is described without specifically limiting the physical amounts.

Processes illustrated in FIG. 12 are executed by an encoding unit 24. Furthermore, in the processes illustrated in FIG. 12, as illustrated in FIG. 1, it is assumed that two systems of tactile signals (that is, the tactile signals representing physical amounts different from each other) by first and second tactile sensors 5-1 and 5-2 are input to an encoding device 2.

Note that the processes at steps S202 to S211 are repeatedly executed for each predetermined block size (for each number of samples of one frame).

In FIG. 12, the encoding unit 24 first determines a signal to be made an original signal and a signal of which difference from the original signal is obtained at step S201. That is, regarding the tactile signals detected by the first and second tactile sensors 5-1 and 5-2, it is determined which is the "original signal" and which is the "signal of which difference is obtained".

This determination criterion may be such that a signal representing a physical amount more likely to be presented is selected as the original signal, or it is selected on the basis of a dynamic range of each signal (selected such that a data amount of the original signal is small).

At subsequent step S202, the encoding unit 24 determines whether or not the physical amount of the signal of which difference is obtained may be obtained by an integration operation of the original signal. For example, in a case where the physical amount of the signal of which difference is obtained is the displacement and the physical amount of the original signal is the acceleration as in the first example described above, a positive result is obtained that the physical amount of the signal of which difference is obtained may be obtained by the integration operation of the original signal.

Note that a determining process at step S202 may also be performed from mathematical knowledge by preparing a format in which channels for recording each physical amount are defined. Alternatively, this may also be performed on the basis of a frequency analysis result of each signal. For example, in a case where the frequency analysis result that the original signal is linearly attenuated on a frequency axis is obtained, it may be considered that the original signal represents the physical amount obtained by the integration operation.

At step S202, in a case where a negative result is obtained that the physical amount of the signal of which difference is obtained cannot be obtained by the integration operation of the original signal, the encoding unit 24 proceeds to step S203 to calculate first-order differentiation of a target signal and determine whether or not required differentiation is completed at step S204.

For example, if the required differentiation is of first-order, the first-order differentiation operation is performed on the original signal at step S203, a positive result is obtained at step S204 according to the differentiation operation, and the procedure shifts to step S205.

Alternatively, if the required differentiation is of second-order, the differentiation at step S203 is performed twice. The first time, the first-order differentiation operation is performed on the original signal, and the second time, the first-order differentiation operation is performed on the signal obtained by the first-order differentiation operation. Then, the positive result is obtained at step S204, and the procedure shifts to step S205.

Here, a case where the required differentiation is of first-order corresponds to, for example, a case where the original signal is the displacement and the signal of which difference is obtained is the speed, and a case where the original signal is the speed and the signal of which difference is obtained is the acceleration. Furthermore, a case where the required differentiation is of second-order corresponds to, for example, a case where the original signal is the displacement and the signal of which difference is obtained is the acceleration.

At step S205, the encoding unit 24 calculates a difference signal between a differential signal obtained by the processes at steps S203 and S204 described above and the signal of which difference is obtained, and proceeds to step S212.

Therefore, for example, in a case where the original signal is the displacement and the signal difference of which is obtained is the acceleration as in the second example, it is possible to store the original signal=the displacement signal, and the difference signal=the difference signal between the differential signal of displacement and the acceleration signal in the coded data Dc.

At step S212, the encoding unit 24 determines whether or not the encoding is finished. That is, it is determined whether or not a finishing condition of the encoding is established; for example, an input of the signal to be encoded is interrupted and the like. When the encoding is finished, the encoding unit 24 finishes a series of processes illustrated in FIG. 12, and when the encoding is not finished, the procedure returns to step S202.

Furthermore, at step S202 above, in a case where a positive result that the physical amount of the signal of which difference is obtained may be obtained by the integration operation of the original signal is obtained, the encoding unit 24 proceeds to step S206 and determines whether or not the reference value of the integral signal to be obtained is detected. With a determining process at step S210 described later, the process at step S206 may be executed up to twice (up to twice per frame).

Here, the "integral signal to be obtained" corresponds to the speed signal corresponding to the first-order integration of the acceleration (original signal) at first step S206, for example, and corresponds to the displacement signal corresponding to the first-order integration of the speed signal obtained by the first time integration at second step S206 in a case where the required integration is of second-order. Furthermore, when the required integration is of first-order, the "integral signal to be obtained" corresponds to, for example, the speed signal corresponding to the first-order integration of the acceleration signal when the original signal is the acceleration signal, and corresponds to the displacement signal corresponding to the first-order integration of the speed signal when the original signal is the speed signal.

The fact that "the reference value of the integral signal to be obtained is detected" means that the reference value of the "integral signal to be obtained" is detected by a corresponding sensor. For example, in a case where the original signal is the acceleration signal and the signal of which difference is obtained is the displacement signal as in the first example, and in a case where only the displacement out of the reference value of speed and the reference value of displacement required for converting the acceleration signal to the displacement is detected by the corresponding sensor, first step S206 (that is, in a case where the "integral signal to be obtained" is the speed signal) does not correspond to the fact that "the reference value of the integral signal to be obtained is detected", whereas second step S206 (in a case where the "integral signal to be obtained" is the displacement signal) corresponds to the fact that "the reference value of the integral signal to be obtained is detected".

Alternatively, in a case where the original signal is the speed signal and the signal of which difference is obtained is the displacement signal, in a case where the reference value of displacement required for converting the original signal into the displacement signal is detected by the corresponding sensor, this corresponds to the fact that "the reference value of the integral signal to be obtained is detected".

In a case where a negative result that the reference value of the integral signal to be obtained is not detected is obtained at step S206, the encoding unit 24 acquires the reference value from a difference between a plurality of samples of a signal lower than the signal of which difference is obtained by one order at step S207. This corresponds to, for example, in the first example, the fact that the speed reference value calculation unit 43 illustrated in FIG. 5 calculates the reference value of speed on the basis of the displacement signal (signal of which difference is obtained) to obtain.

Furthermore, in a case where a positive result that the reference value of the integral signal to be obtained is detected is obtained at step S206, the encoding unit 24 obtains the reference value from the signal of which difference is obtained at step S208.

The encoding unit 24 proceeds to step S209 in response to execution of the process at step S207 or S208, and performs conversion by first-order integration.

That is, for example, in a case where the "integral signal to be obtained" is the speed signal, the acceleration signal is converted by the first-order integration using the reference value obtained by the corresponding process out of steps S207 and S208. Furthermore, in a case where the "integral signal to be obtained" is the displacement signal, the speed signal is converted by the first-order integration using the reference value obtained by the corresponding process out of steps S207 and S208.

Next, at step S210, the encoding unit 24 determines whether or not the required integration is completed. If the required integration is not completed, the encoding unit 24 returns to step S206, and if the required integration is completed, the procedure shifts to step S211.

For confirmation, a case where the required integration is of first-order corresponds to, for example, a case where the original signal is the acceleration and the signal of which difference is obtained is the speed, and a case where the original signal is the speed and the signal of which difference is obtained is the displacement. Furthermore, a case where the required integration is of second-order corresponds to, for example, a case where the original signal is the acceleration and the signal of which difference is obtained is the displacement.

If the required integration is completed at step S210, the encoding unit 24 proceeds to step S211 to calculate the difference signal between the integral signal and the signal of which difference is obtained, and proceeds to step S212 described above. Note that, at step S210, the "integral signal" means the original signal in which the required integration is completed.

By the above-described processes, it is possible to perform the encoding to compress the information amount on a plurality of signals representing the physical amounts that may be converted with each other by the second-order calculus operation at the maximum.

Here, in encoding, the difference signal may have a shorter code length as a dynamic range as compared to an entire signal is smaller, and an effect of compressing the information amount becomes larger. On the basis of this, the original signal may be selected at step S201 so that the dynamic range of the difference signal becomes small.

Furthermore, it is also possible to compare the obtained difference signal with the "signal of which difference is obtained", and feed back so that the difference signal becomes smaller due to a time shift and the like.

Note that the conversion error may simply be a time lag from the "signal of which difference is obtained", so that, in that case, by making the error information the information of the time lag, the information amount may be further reduced.

Furthermore, depending on a nature of the signal, the original signal may be biased so as to reduce the difference signal. For example, in a case where the acceleration is the original signal and the displacement is the difference signal, it may be expected that the dynamic range of the difference signal may be reduced by applying a very small bias to the acceleration from a result of comparing the difference signal and the "signal of which difference is obtained".

6. SUMMARY OF EMBODIMENT

As described above, the encoding device (2) as the embodiment is provided with the encoding unit (24) that performs the encoding to compress the information amount by utilizing the interconversion property between the physical amounts on a plurality of tactile signals representing different physical amounts to generate the coded data.

This makes it possible to obtain the tactile signals representing desired physical amounts within a range in which interconversion may be performed while compressing the information amount by utilizing the interconversion property between the physical amounts.

Therefore, it becomes possible to reduce the data amount required for tactile presentation while enabling driving of the different types of tactile presentation devices corresponding to different physical amounts.

In the encoding device according to the present technology described above, the encoding unit desirably allows the coded data to include the specific signal that is the tactile signal representing the specific physical amount and the error information representing the conversion error when the specific signal is converted into the tactile signal representing another physical amount.

Therefore, the decoding side may correctly obtain the tactile signal representing the physical amount other than the physical amount of the specific signal (specific physical amount) by correcting the signal obtained by physical amount conversion of the specific signal on the basis of the error information. Therefore, it becomes not necessary that the coded data includes the tactile signal itself representing the physical amount other than the specific physical amount.

Therefore, it is possible to reduce the data amount required for the tactile presentation while realizing the correct tactile reproduction.

In the encoding device according to the present technology described above, it is desirable that the encoding unit allows the coded data to include, as the error information, the difference information indicating the difference value between the specific signal and the tactile signal representing another physical amount.

Therefore, the error correction for the converted signal of the specific signal may be realized by a simple process of adding the difference value indicated by the difference information to the converted signal of the specific signal.

Therefore, it is possible to reduce the processing load when realizing the correction of the conversion error.

In the encoding device according to the present technology described above, it is desirable that the encoding unit allows the coded data to include, as the error information, the identification information for identifying the physical amount represented by the specific signal.

Therefore, it becomes not necessary to perform signal analysis on the specific signal when specifying the physical amount of the specific signal on the decoding side.

Therefore, it is possible to reduce the processing load of decoding.

In the encoding device according to the present technology described above, it is desirable that the encoding unit performs the encoding to compress the information amount by utilizing the interconversion property by calculus as the encoding.

Therefore, on the decoding side, the tactile signal representing a desired physical amount out of displacement, speed, and acceleration may be obtained on the basis of the coded data.

Therefore, it is possible to realize a system capable of performing tactile presentation regardless of the physical amount out of displacement, speed, and acceleration to which the tactile presentation device corresponds.

As described above, the decoding device (reproduction device 3) as the embodiment is provided with the decoding unit (decoding processing unit F2, decoding unit 34) that decodes the coded data generated by performing the encoding to compress the information amount by utilizing the interconversion property between the physical amounts on a plurality of tactile signals representing different physical amounts to obtain the tactile signal.

This makes it possible to obtain the tactile signals representing desired physical amounts within a range in which interconversion may be performed while compressing the information amount by utilizing the interconversion property between the physical amounts.

Therefore, it becomes possible to reduce the data amount required for tactile presentation while enabling driving of the different types of tactile presentation devices corresponding to different physical amounts.

Furthermore, in the decoding device as the embodiment, the coded data includes the specific signal which is the tactile signal representing the specific physical amount and the error information indicating the conversion error when the specific signal is converted into the tactile signal representing another physical amount, and the decoding unit converts the specific signal into the tactile signal representing another physical amount and corrects the converted tactile signal on the basis of the error information.

Therefore, it becomes not necessary that the coded data includes the signal itself as for the tactile signal representing the physical amount other than the physical amount of the specific signal (specific physical amount). At that time, since the signal obtained by the physical amount conversion of the specific signal is corrected on the basis of the error information, it becomes possible to correctly obtain the tactile signal representing the physical amount other than the specific physical amount.

Therefore, it is possible to reduce the data amount required for the tactile presentation while realizing the correct tactile reproduction.

Moreover, in the decoding device as the embodiment, the error information is made the difference information representing the difference value between the specific signal and the tactile signal representing another physical amount.

Therefore, the error correction for the converted signal of the specific signal may be realized by a simple process of adding the difference value indicated by the difference information to the converted signal of the specific signal.

Therefore, it is possible to reduce the processing load when realizing the correction of the conversion error.

Moreover, in the decoding device as the embodiment, the coded data includes identification information for identifying the physical amount represented by the specific signal, and the decoding unit performs the decoding on the basis of the identification information.

Therefore, it becomes not necessary to perform signal analysis on the specific signal when specifying the physical amount of the specific signal.

Therefore, it is possible to reduce the processing load of decoding.

Furthermore, in the decoding device as the embodiment, the decoding unit outputs the specific signal in a case where the physical amount of the specific signal specified on the basis of the identification information coincides with a predetermined physical amount.

Therefore, it is possible to appropriately drive the tactile presentation device on the basis of the specific signal corresponding to a case where the physical amount of the specific signal coincides with the physical amount to which the tactile presentation device corresponds.

Therefore, an appropriate tactile presentation may be performed.

Moreover, in the decoding device as the embodiment, in a case where the physical amount of the specific signal specified on the basis of the identification information does not coincide with a predetermined physical amount, the decoding unit converts the specific signal into a signal representing a predetermined physical amount, and corrects the converted signal on the basis of the error information to output.

Therefore, it is possible to appropriately drive the tactile presentation device by the signal obtained by correcting the converted signal of the specific signal on the basis of the error information corresponding to a case where the physical amount of the specific signal does not coincide with the physical amount to which the tactile presentation device corresponds.

Therefore, an appropriate tactile presentation may be performed.

Moreover, in the decoding device as the embodiment, the decoding unit decodes the coded data generated by the encoding to compress the information amount by utilizing an interconversion property by calculus.

Therefore, the tactile signal representing a desired physical amount out of displacement, speed, and acceleration may be obtained on the basis of the coded data.

Therefore, it is possible to realize a system capable of performing tactile presentation regardless of the physical amount out of displacement, speed, and acceleration to which the tactile presentation device corresponds.

Furthermore, in the decoding device as the embodiment, the decoding unit adjusts the amplitude of the tactile signal obtained by decoding.

This makes it possible to appropriately adjust magnitude of the amplitude of the tactile signal according to the type of the tactile presentation device driven on the basis of the tactile signal.

Therefore, an appropriate tactile presentation may be realized.

Furthermore, a decoding method as the embodiment is a decoding method of decoding coded data generated by performing encoding to compress an information amount by utilizing an interconversion property between physical amounts on a plurality of tactile signals representing different physical amounts to obtain a tactile signal.

By such decoding method as the embodiment also, the action and effect similar to those of the decoding device as the above-described embodiment may be obtained.

Here, the functions of the encoding unit (24) and the decoding processing unit (F2) described so far may be realized as software processing by a CPU and the like. The software processing is executed on the basis of a program, and the program is stored in a storage device readable by a computer device (information processing device) such as the CPU.

A program on an encoding side as the embodiment is a program that allows an information processing device to realize a function of generating coded data by performing encoding to compress an information amount by utilizing an interconversion property between physical amounts on a plurality of tactile signals representing different physical amounts.

By such program, the encoding device as the above-described embodiment may be realized.

Furthermore, a program on a decoding side as the embodiment is a program that allows an information processing device to realize a function of obtaining a tactile signal by decoding coded data generated by performing encoding to compress an information amount by utilizing an interconversion property between physical amounts on a plurality of tactile signals representing different physical amounts.

By such program, the decoding device as the above-described embodiment may be realized.

Note that the effect described in this specification is illustrative only; the effect is not limited thereto and there may also be another effect.

7. PRESENT TECHNOLOGY

Note that the present technology may also have following configurations.

(1)
An encoding device provided with:
an encoding unit that generates coded data by performing encoding to compress an information amount by utilizing an interconversion property between physical amounts on a plurality of tactile signals representing different physical amounts.

(2)
The encoding device according to (1) described above,
in which the encoding unit allows the coded data to include a specific signal that is a tactile signal representing a specific physical amount, and error information indicating a conversion error when the specific signal is converted into a tactile signal representing another physical amount.

(3)
The encoding device according to (2) described above,
in which the encoding unit allows the coded data to include difference information indicating a difference value between the specific signal and the tactile signal representing another physical amount as the error information.

(4)
The encoding device according to (2) or (3) described above,
in which the encoding unit allows the coded data to include identification information for identifying the physical amount represented by the specific signal as the error information.

(5)
The encoding device according to any one of (1) to (4) described above,
in which the encoding unit performs encoding to compress an information amount by utilizing an interconversion property by calculus as the encoding.

(6)
A decoding device provided with:
a decoding unit that decodes coded data generated by performing encoding to compress an information amount by utilizing an interconversion property between physical amounts on a plurality of tactile signals representing different physical amounts to obtain a tactile signal.

(7)
The decoding device according to (6) described above,
in which the coded data includes a specific signal that is a tactile signal representing a specific physical amount and error information indicating a conversion error when the specific signal is converted into a tactile signal representing another physical amount, and
the decoding unit converts the specific signal into the tactile signal representing another physical amount and corrects the converted tactile signal on the basis of the error information.

(8)
The decoding device according to (7) described above,
in which the error information is made difference information indicating a difference value between the specific signal and the tactile signal representing another physical amount.

(9)
The decoding device according to (7) or (8) described above,
in which the coded data includes identification information for identifying the physical amount represented by the specific signal, and
the decoding unit performs the decoding on the basis of the identification information.

(10)
The decoding device according to (9) described above,
in which, in a case where the physical amount of the specific signal specified on the basis of the identification information coincides with a predetermined physical amount, the decoding unit outputs the specific signal.

(11)
The decoding device according to (9) or (10) described above,
in which, in a case where the physical amount of the specific signal specified on the basis of the identification information does not coincide with a predetermined physical amount, the decoding unit converts the specific signal into a signal representing the predetermined physical amount, and corrects the converted signal on the basis of the error information to output.

(12)
The decoding device according to any one of (6) to (11) described above,
in which the decoding unit decodes the coded data generated by encoding to compress an information amount by utilizing an interconversion property by calculus.

(13)
The decoding device according to any one of (6) to (12),
in which the decoding unit adjusts amplitude of the tactile signal obtained by the decoding.

REFERENCE SIGNS LIST

1 Tactile reproduction system
2 Encoding device
3 Reproduction device
5-1 First tactile sensor
5-2 Second tactile sensor
6 Tactile presentation device
Dc Coded data
24 Encoding unit
24a Signal analysis unit 24b Coded data generation unit
34 Decoding unit
36 Communication unit
37 Media drive
40 Second-order integration unit
41, 41A Difference calculation unit
42 Displacement reference value acquisition unit
43 Speed reference value calculation unit
44, 44A Coded data generation unit
45 Second-order differentiation unit
F1 Acquisition processing unit
F2 Decoding processing unit

The invention claimed is:

1. An encoding device comprising:
encoding circuitry configured to generate coded data by performing encoding to compress an information amount by utilizing an interconversion property between physical amounts on a plurality of tactile signals representing different physical amounts,
wherein the coded data includes a first tactile signal of the plurality of tactile signals representing a specific physical amount, and error information indicating a conversion error when the first tactile signal is converted into a tactile signal representing another physical amount, the encoding circuitry being configured to:
convert the first tactile signal by integration or differentiation of the first tactile signal to provide a converted signal; and
calculate a difference between a second tactile signal of the plurality of tactile signals and the converted signal to provide the error information.

2. The encoding device according to claim 1,
wherein the coded data includes identification information for identifying the physical amount represented by the first tactile signal.

3. An encoding method executed by encoding circuitry, the method comprising:
generating coded data by performing encoding to compress an information amount by utilizing an interconversion property between physical amounts on a plurality of tactile signals representing different physical amounts, the generating coded data comprising:
converting the first tactile signal by integration or differentiation of the first tactile signal to provide a converted signal; and
calculating a difference between a second tactile signal of the plurality of tactile signals and the converted signal to provide the error information.

4. A non-transitory computer readable medium storing instructions that, when executed by encoding circuitry, perform an encoding method comprising:
generating coded data by performing encoding to compress an information amount by utilizing an interconversion property between physical amounts on a plurality of tactile signals representing different physical amounts, the generating coded data including:
converting the first tactile signal by integration or differentiation of the first tactile signal to provide a converted signal; and
calculating a difference between a second tactile signal of the plurality of tactile signals and the converted signal to provide the error information.

5. A decoding device comprising:
decoding circuitry configured to decode coded data generated by performing encoding to compress an information amount by utilizing an interconversion property between physical amounts on a plurality of tactile signals representing different physical amounts,
wherein the coded data includes a first tactile signal of the plurality of tactile signals representing a specific physical amount and error information indicating a conversion error when the first tactile signal is converted into a tactile signal representing another physical amount, the decoding circuitry being configured to:
convert the first tactile signal by integration or differentiation to provide a converted tactile signal; and
correct the converted tactile signal based on the error information to provide the tactile signal representing the other physical amount.

6. The decoding device according to claim 5,
wherein the coded data includes identification information for identifying the physical amount represented by the first tactile signal, and
the decoding circuitry is configured to perform the decoding on a basis of the identification information.

7. The decoding device according to claim 6,
wherein, in a case where the physical amount of the first tactile signal specified on a basis of the identification information coincides with a predetermined physical amount, the decoding circuitry is configured to output the first tactile signal.

8. The decoding device according to claim 6,
wherein, in a case where the physical amount of the first tactile signal specified on a basis of the identification information does not coincide with a predetermined physical amount, the decoding circuitry is configured to convert the first tactile signal into a signal representing the predetermined physical amount, and to correct the converted signal on a basis of the error information.

9. The decoding device according to claim 5,
wherein the decoding circuitry is configured to adjust amplitude of the tactile signal obtained by the decoding.

10. A decoding method comprising:
decoding coded data generated by performing encoding to compress an information amount by utilizing an interconversion property between physical amounts on a plurality of tactile signals representing different physical amounts,
wherein the coded data includes a first tactile signal of the plurality of tactile signals representing a specific physical amount and error information indicating a conversion error when the first tactile signal is converted into a tactile signal representing another physical amount, the decoding coded data including:
converting the first tactile signal by integration or differentiation to provide a converted tactile signal; and
correcting the converted tactile signal based on the error information to provide the tactile signal representing the other physical amount.

11. A non-transitory computer readable medium storing instructions that, when executed by decoding circuitry, perform a decoding method comprising:
decoding coded data generated by performing encoding to compress an information amount by utilizing an interconversion property between physical amounts on a plurality of tactile signals representing different physical amounts,
wherein the coded data includes a first tactile signal of the plurality of tactile signals representing a specific physical amount and error information indicating a conversion error when the first tactile signal is converted into a tactile signal representing another physical amount, the decoding coded data including:

converting the first tactile signal by integration or differentiation to provide a converted tactile signal; and correcting the converted tactile signal based on the error information to provide the tactile signal representing the other physical amount.

\* \* \* \* \*